(12) United States Patent
Chang et al.

(10) Patent No.: US 10,784,538 B2
(45) Date of Patent: Sep. 22, 2020

(54) MULTIFUNCTIONAL ENERGY STORAGE COMPOSITES

(71) Applicant: The Board of Trustees of the Leland Stanford Junior University, Stanford, CA (US)

(72) Inventors: Fu Kuo Chang, Palo Alto, CA (US); Raphael Gerard Christian Nardari, Palo Alto, CA (US); Purim Ladpli, Palo Alto, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 140 days.

(21) Appl. No.: 15/549,117

(22) PCT Filed: Feb. 5, 2016

(86) PCT No.: PCT/US2016/016877
§ 371 (c)(1),
(2) Date: Aug. 4, 2017

(87) PCT Pub. No.: WO2016/127122
PCT Pub. Date: Aug. 11, 2016

(65) Prior Publication Data
US 2018/0040912 A1    Feb. 8, 2018

Related U.S. Application Data

(60) Provisional application No. 62/113,282, filed on Feb. 6, 2015.

(51) Int. Cl.
*H01M 10/058* (2010.01)
*H01M 10/02* (2006.01)
(Continued)

(52) U.S. Cl.
CPC .......... *H01M 10/058* (2013.01); *H01G 11/12* (2013.01); *H01G 11/82* (2013.01);
(Continued)

(58) Field of Classification Search
CPC ............... H01M 10/02; H01M 10/052; H01M 10/0525; H01M 10/058; H01M 10/0585; H01M 2/0257; H01M 2/0282; H01M 6/02
See application file for complete search history.

(56) References Cited

U.S. PATENT DOCUMENTS 6,103,417 A * 8/2000 Rapeli .................... H01M 2/18
429/143
6,432,576 B1 * 8/2002 Hikmet ............... H01M 2/0207
429/127

(Continued)

FOREIGN PATENT DOCUMENTS

JP    2002-216779 A    8/2002
JP    2006-294521 A    10/2006
(Continued)

OTHER PUBLICATIONS

Thomas, J.P. et al. (2004) "Mechanical design and performance of composite multifunctional materials," Acta Materialia 52:2155-2164.
(Continued)

*Primary Examiner* — Carlos Barcena
(74) *Attorney, Agent, or Firm* — Foley & Lardner LLP

(57) ABSTRACT

Described here is a multifunctional energy storage (MES) composite comprising (a) a stack of energy storage materials and (b) one or more structural facesheets sandwiching the stack of energy storage materials, wherein the stack of battery materials is perforated by (c) one or more reinforcements, and wherein the reinforcements are bonded to the
(Continued)

structural facesheets. Also described here is a MES composite comprising (a) a stack of energy storage materials, (b) one or more structural facesheets sandwiching the stack of energy storage materials, and (c) one or more reinforcements perforated by the stack of energy storage materials, wherein the reinforcements are bonded to the structural facesheets.

22 Claims, 30 Drawing Sheets

(51) Int. Cl.
<table>
<tr><td>H01M 10/052</td><td>(2010.01)</td></tr>
<tr><td>H01M 6/02</td><td>(2006.01)</td></tr>
<tr><td>H01M 2/02</td><td>(2006.01)</td></tr>
<tr><td>H01M 10/0585</td><td>(2010.01)</td></tr>
<tr><td>H01M 10/0525</td><td>(2010.01)</td></tr>
<tr><td>H01G 11/12</td><td>(2013.01)</td></tr>
<tr><td>H01G 11/84</td><td>(2013.01)</td></tr>
<tr><td>H01G 11/82</td><td>(2013.01)</td></tr>
</table>

(52) U.S. Cl.
CPC .......... *H01G 11/84* (2013.01); *H01M 2/0257* (2013.01); *H01M 2/0282* (2013.01); *H01M 6/02* (2013.01); *H01M 10/02* (2013.01); *H01M 10/052* (2013.01); *H01M 10/0525* (2013.01); *H01M 10/0585* (2013.01); *Y02T 10/7011* (2013.01)

(56) References Cited

U.S. PATENT DOCUMENTS

| | | | |
|---|---|---|---|
| 7,211,348 B2 | 5/2007 | Wadley et al. | |
| 7,785,749 B2 | 8/2010 | Bae et al. | |
| 9,368,830 B2 * | 6/2016 | Hwang | H01M 10/049 |
| 2005/0158619 A1 * | 7/2005 | Honda | H01M 10/0436 |
| | | | 429/161 |
| 2007/0099068 A1 | 5/2007 | Suzuki et al. | |
| 2009/0023030 A1 | 1/2009 | Bae et al. | |
| 2009/0035636 A1 | 2/2009 | Bae et al. | |
| 2012/0148892 A1 * | 6/2012 | Hoecker | B29C 45/14467 |
| | | | 429/99 |
| 2015/0155589 A1 * | 6/2015 | Suh | H01M 10/0463 |
| | | | 429/127 |
| 2016/0197373 A1 * | 7/2016 | Shaffer, II | H01M 10/0418 |
| | | | 429/210 |

FOREIGN PATENT DOCUMENTS

| | | |
|---|---|---|
| JP | 2007-179870 A | 7/2007 |
| KR | 100874110 B1 | 12/2008 |
| WO | WO-2013/062623 A1 | 5/2013 |

OTHER PUBLICATIONS

International Search Report and Written Opinion (ISR/WO) in International Application No. PCT/US2016/016877, dated May 20, 2016.

Extended European Search Report in European Application No. 16747384.2, dated May 23, 2018.

First Office Action and Search Report on CN Application No. 201680016316.7 dated May 22, 2020, 33 pages (English Translation).

\* cited by examiner

MULTIFUNCTIONAL ENERGY STORAGE COMPOSITES

CROSS-REFERENCE TO RELATED APPLICATIONS

This application is a national stage entry under 35 U.S.C. § 371 of International Patent Application No. PCT/US2016/016877, filed Feb. 5, 2016, which in turn claims the benefit of U.S. Provisional Patent Application No. 62/113,282 filed Feb. 6, 2015, the content of which is incorporated herein by reference in its entirety.

FEDERAL FUNDING STATEMENT

This invention was made with Government support under Contract No. DE-AR0000393, awarded by U.S. Department of Energy. The Government has certain rights in the invention.

BACKGROUND

Research interest in electrochemical energy storage devices has grown substantially in the past few decades. Cutting-edge advanced energy storage technologies have expanded the capabilities of a wide range of electric-powered engineering platforms, from portable electronic devices and biomedical devices, to electric vehicles, to air and spacecraft technologies. Current state-of-the-art electrochemical storage technologies are specifically engineered to primarily satisfy the energy-capacity and power-consumption requirements of the electronic devices. As a result, conventional batteries and electrochemical cells add significant weight and volume without contributing to other functionalities of the system, for instance to the mechanical integrity or the structural performance. The extra weight and volume significantly hinder the system performance and efficiency.

SUMMARY

System improvement can be achieved by making the energy storage multifunctional. Through proper integration of the constituent materials, an electrochemical energy storage can be made capable of synergistically store and provide energy, as well as carry mechanical loads and provide structural integrity to the device. The multifunctional energy storage can be used as a substitution for the otherwise necessary supporting structures in the traditional electric-powered systems.

The multifunctional energy storage (MES) composite described herein embeds electrochemical energy storage materials into structural facesheets and uses through-thickness reinforcements to provide structural rigidity, akin to a sandwich structure construction. The MES composite, when incorporated into an electric-powered device or vehicle, contributes to both the energy storage and mechanical strength capabilities resulting in system weight savings and higher energy efficiency.

This invention described herein is in the field of energy storage and relates generally to incorporating an energy storage device into a structural material resulting in a multifunctional structural energy storage for use in energy-storage, energy-generation, or electric-powered systems.

One aspect of some embodiments of the invention relates to a MES composite comprising (a) a stack of energy storage materials comprising an array of perforations or apertures along an alignment axis parallel to the thickness direction, and (b) one or more structural facesheets sandwiching the stack of energy storage materials, and (c) one or more reinforcements arranged such that they extend a length along an alignment axis passing through the perforations in the stack of energy storage materials, wherein the reinforcements are attached to the structural facesheets. Either side of the reinforcements is in physical contact with the facesheets, and are anchored onto the facesheets linking the facesheets together.

In another aspect of some embodiments of the invention, rather than having the reinforcements disposed in the perforations or apertures of the stack of energy storage materials, the reinforcements themselves can comprise an array of perforations or apertures along an alignment axis parallel to the thickness direction, wherein the apertures or perforations in the reinforcements are filled with the energy storage materials.

The stack of energy storage materials can be a component of an electrochemical cell and wherein the electrochemical cell is selected from the group consisting of: a primary cell, a secondary cell (including but not limited to a lithium cell, a lithium ion cell, a lead-acid cell, a zinc-carbon cell, an alkaline cell, a nickel-cadmium cell, a nickel metal hydride cell, a silver oxide cell, a sodium sulfur cell, etc.), a solid electrochemical cell, a fluid electrochemical cell, a flow battery, a fuel cell, a capacitor, a supercapacitor, a semi-solid battery, and a metal-air battery.

A further aspect of some embodiments of the invention relates to an energy storage device comprising the MES composites.

These and other features, together with the organization and manner of operation thereof, will become apparent from the following detailed description when taken in conjunction with the accompanying drawings.

DETAILED DESCRIPTION

Introduction.

Figure 1:
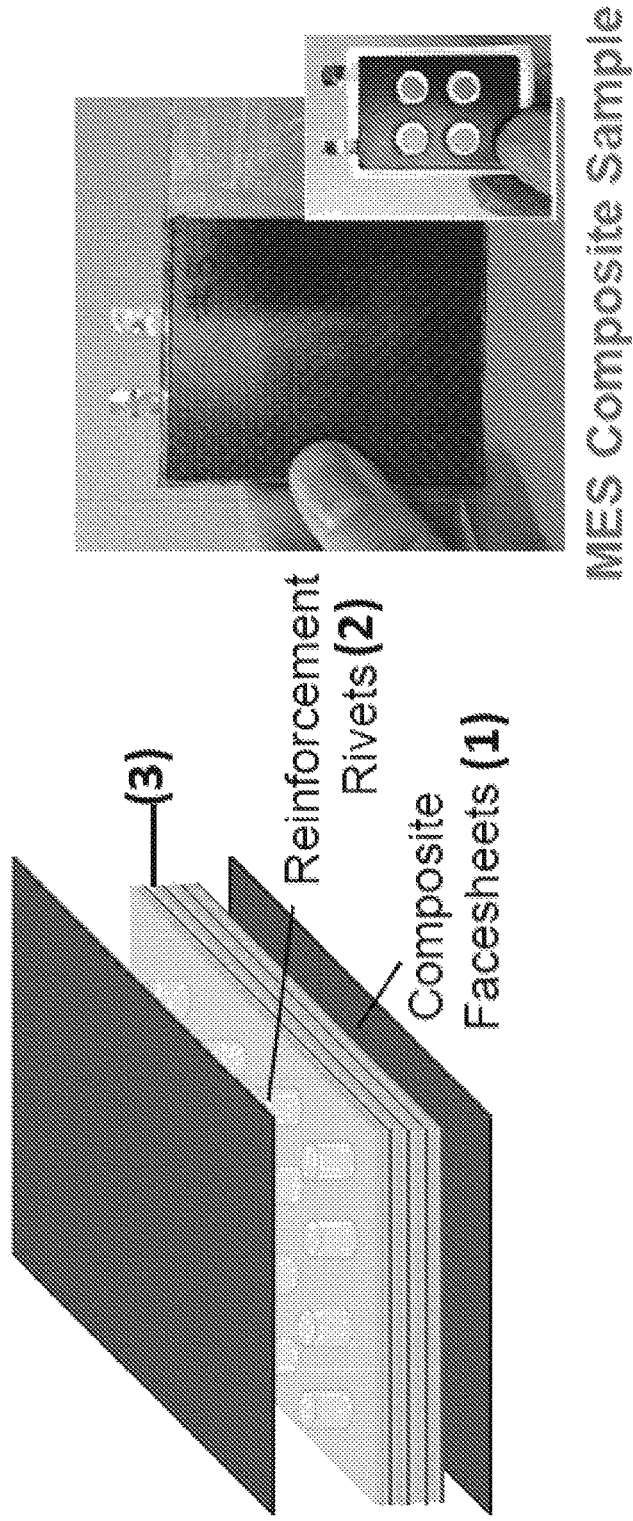
FIG. 1 shows schematically an example MES composite described herein.
Figure 2:
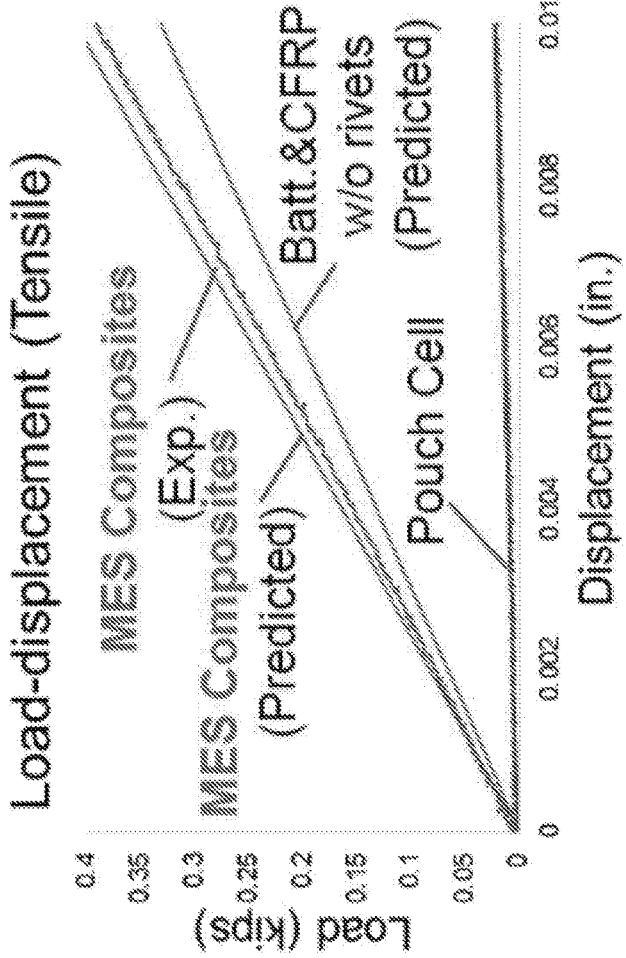
FIG. 2 shows in-plane mechanical performance of an example MES composite. The MES composite was loaded (mechanically) in tension and was found to be stiffer than a conventional Li-ion battery cell.
Figure 2:
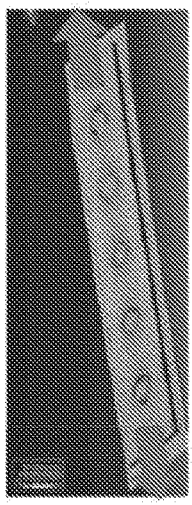
Figure 2:
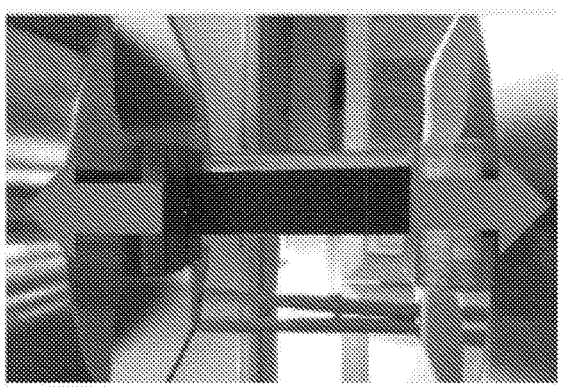
Figure 2:
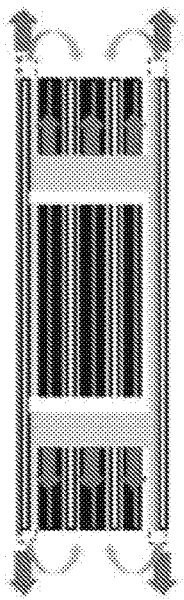
Figure 3:
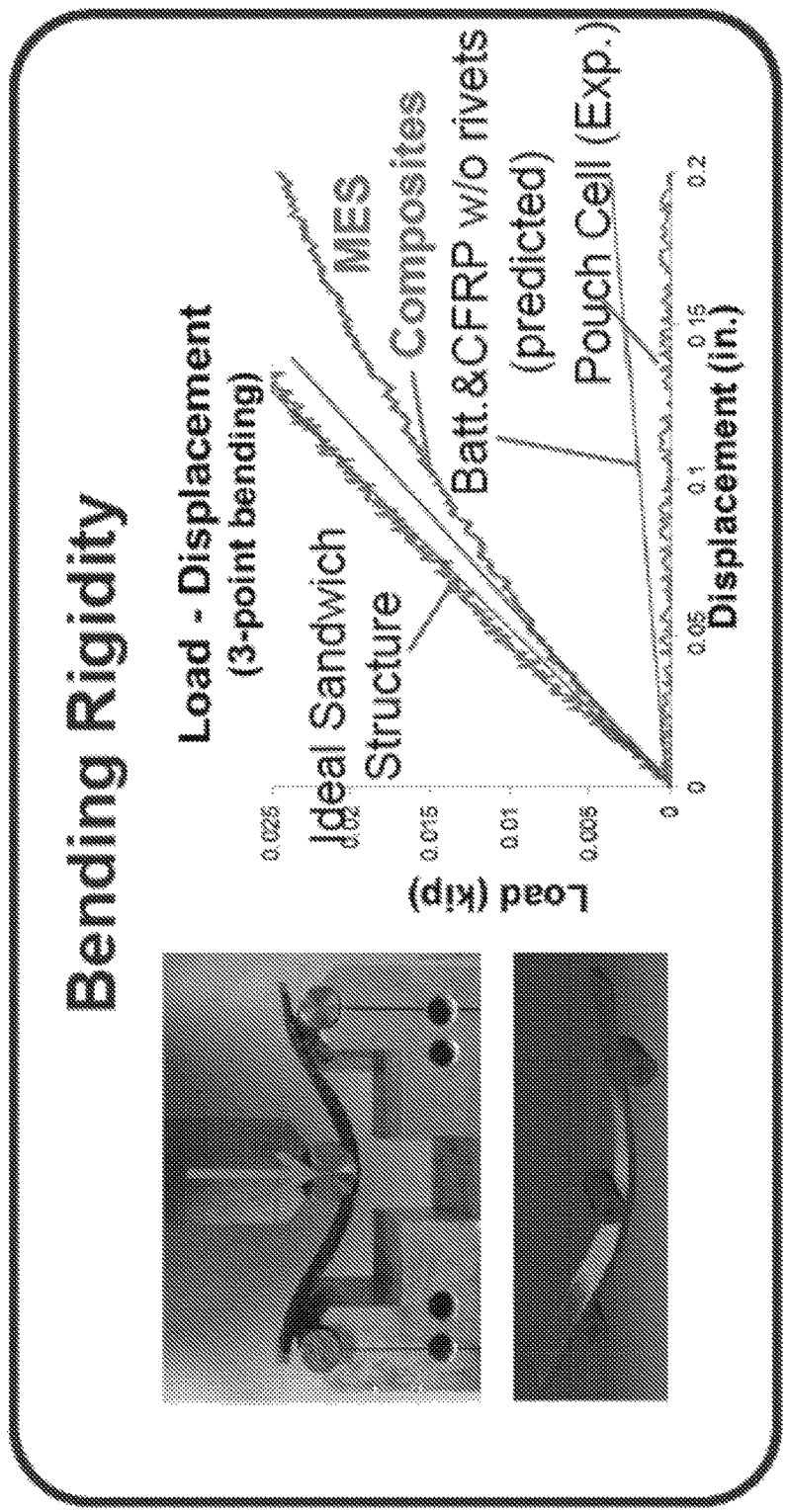
FIG. 3 shows the results of a three-point bending test. An example MES composite was placed on a span, supported at two ends. Another rigid fixture was driven from the top and pressed on to the middle of the sample, causing the sample to 'bend'. The bending rigidity is a measure of the resistance of the sample to the bending. The MES composite was found to be more rigid (resistant to bending) than a conventional Li-ion battery cell.
Figure 4:
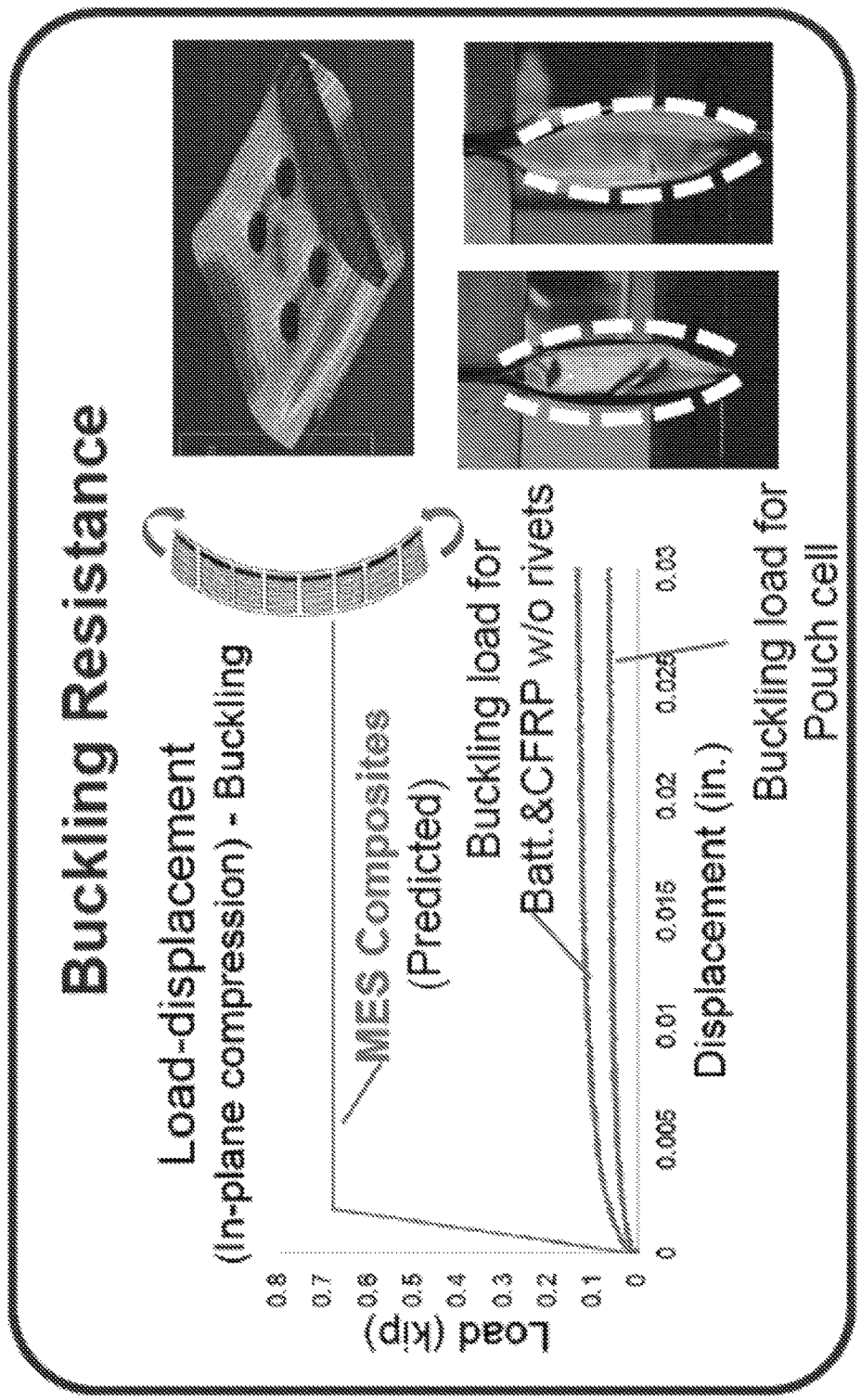
FIG. 4 shows an example MES composite under in-plane compression. Under in-plane compression, a thin, slender sample tends to deform out-of-plane, or so-called, buckles. The resistance to buckling of MES composites was much higher than regular Li-ion cells.
Figure 5:
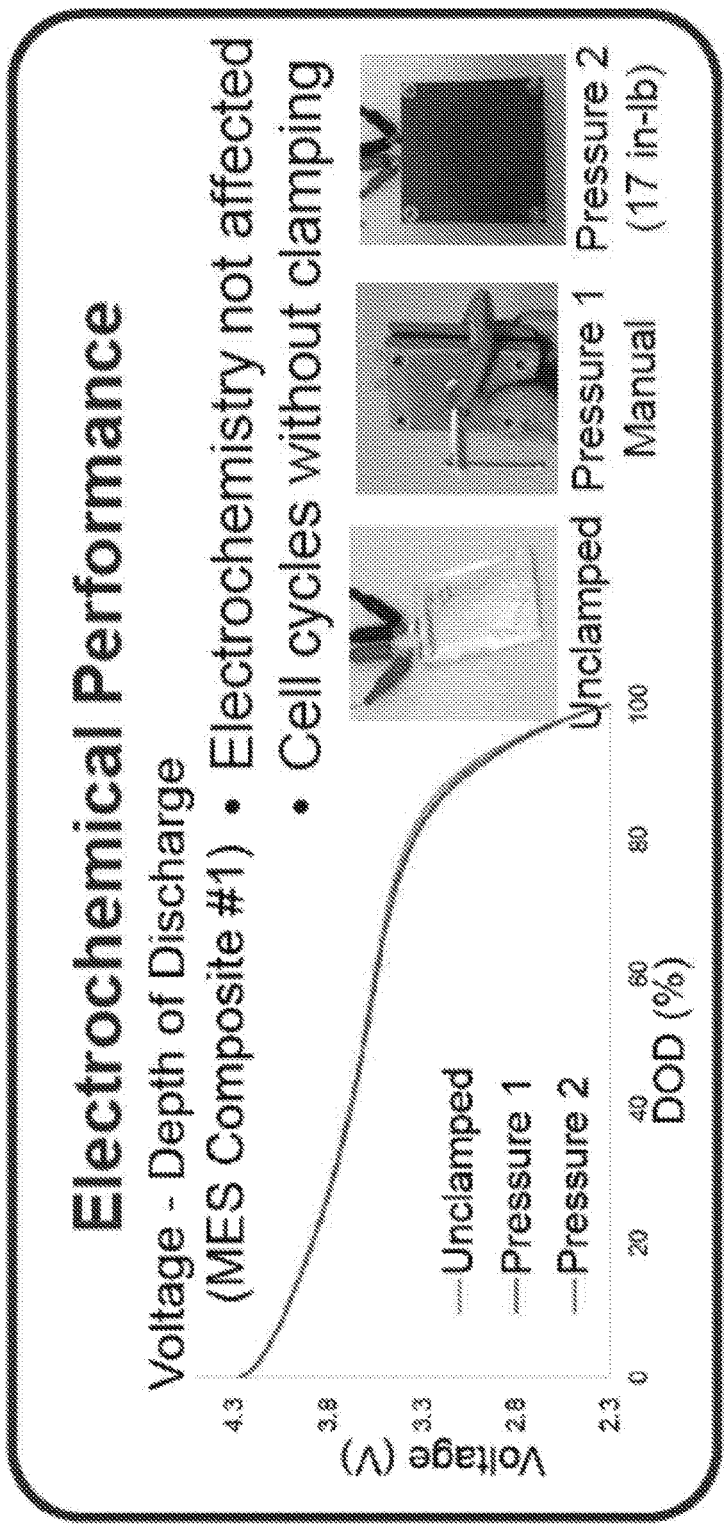
FIG. 5 shows electrochemical performance of an example MES composite. The MES composite is shown to have substantially uncompromised electrochemical performance despite the introduction of unconventional structural materials into a battery cell.
Figure 10:
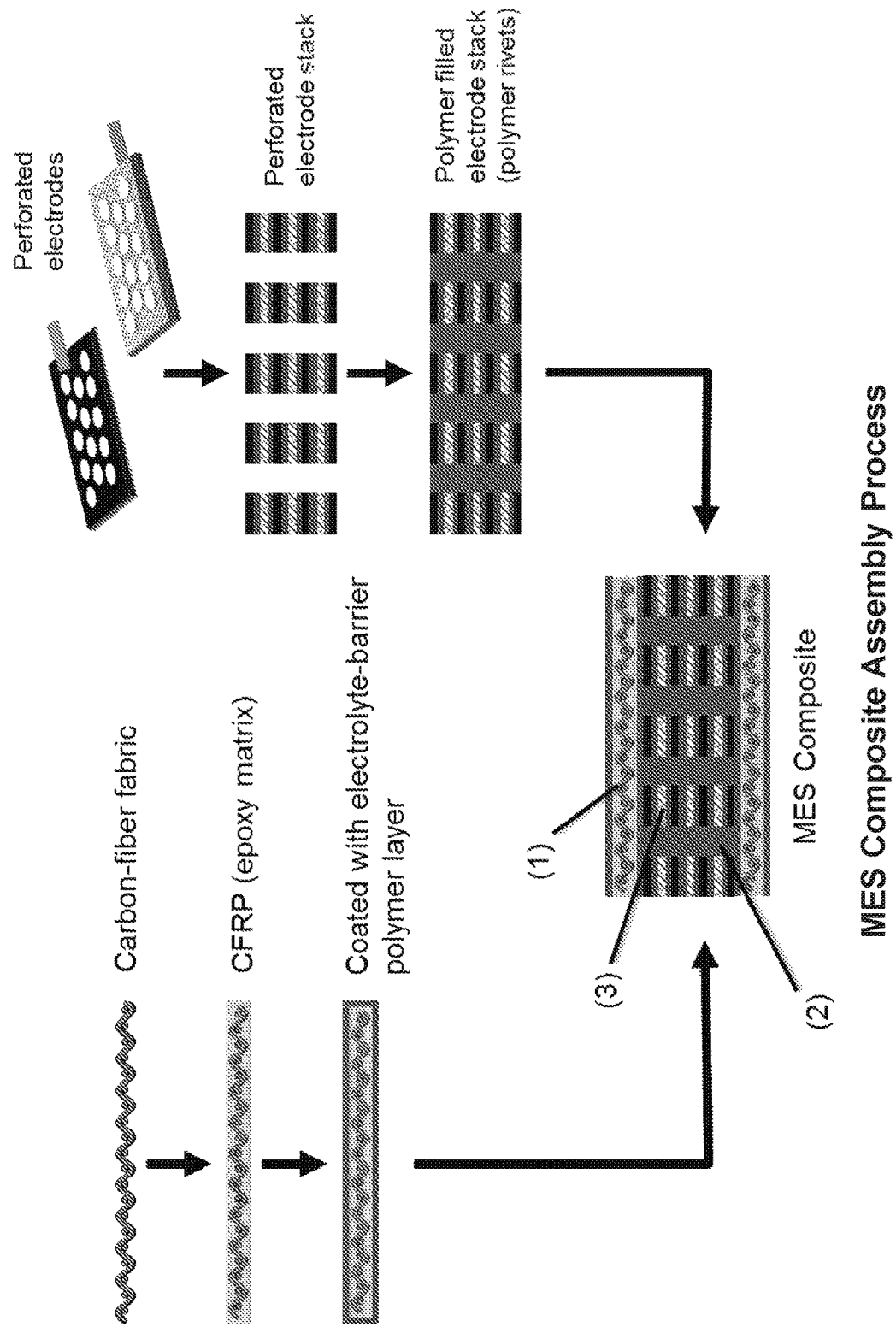
FIG. 10 shows schematically an example MES composite described herein.

The MES composite described herein is designed to solve the issues of conventional stack designs of a pouch cell, by of anchoring the battery layers and further reinforcing them with the outer structural materials. As shown in FIGS. 1 and 10, in some embodiments, the MES composite comprises polymer reinforcements (2), which form an through-thickness anchor linking the electrode stack (3) together and also connect to the two structural facesheets (1) on either side. The polymer reinforcements are distributed at various locations across the cell platform, helping maintaining the rigidity of the battery-and-carbon-carbon fiber sandwich.

With such a design, the in-plane load transfer and the bending rigidity of the battery cell can be increased. Commercial electrochemical cells or batteries are not designed to carry mechanical loads. For example, in commercial lithium-ion pouch battery designs, when an in-plane load is applied on the pouch, since there is just marginal friction but no adhesion between the battery layers, it is essentially the pouch that carries the entire load. Whereas in the MES composite design described herein, not only the structural composite panels on either side help alleviate part of the load, but also the load on the composite can be transferred through the reinforcements to the active materials, which also contribute to load carrying.

Another benefit comes from the increased bending rigidity. In the case of a conventional pouch cell, since the layers are not adhered together and can slide relative to each other, the thin layers are bent individually upon application of an out of plane bending. However in the reinforced cell design, there is no sliding, the thin layers join up and are bent together. The bending rigidity can be significantly increased. Additionally, there are much stiffer components on either surface, which further enhances the stiffness in bending.

Figure 6:
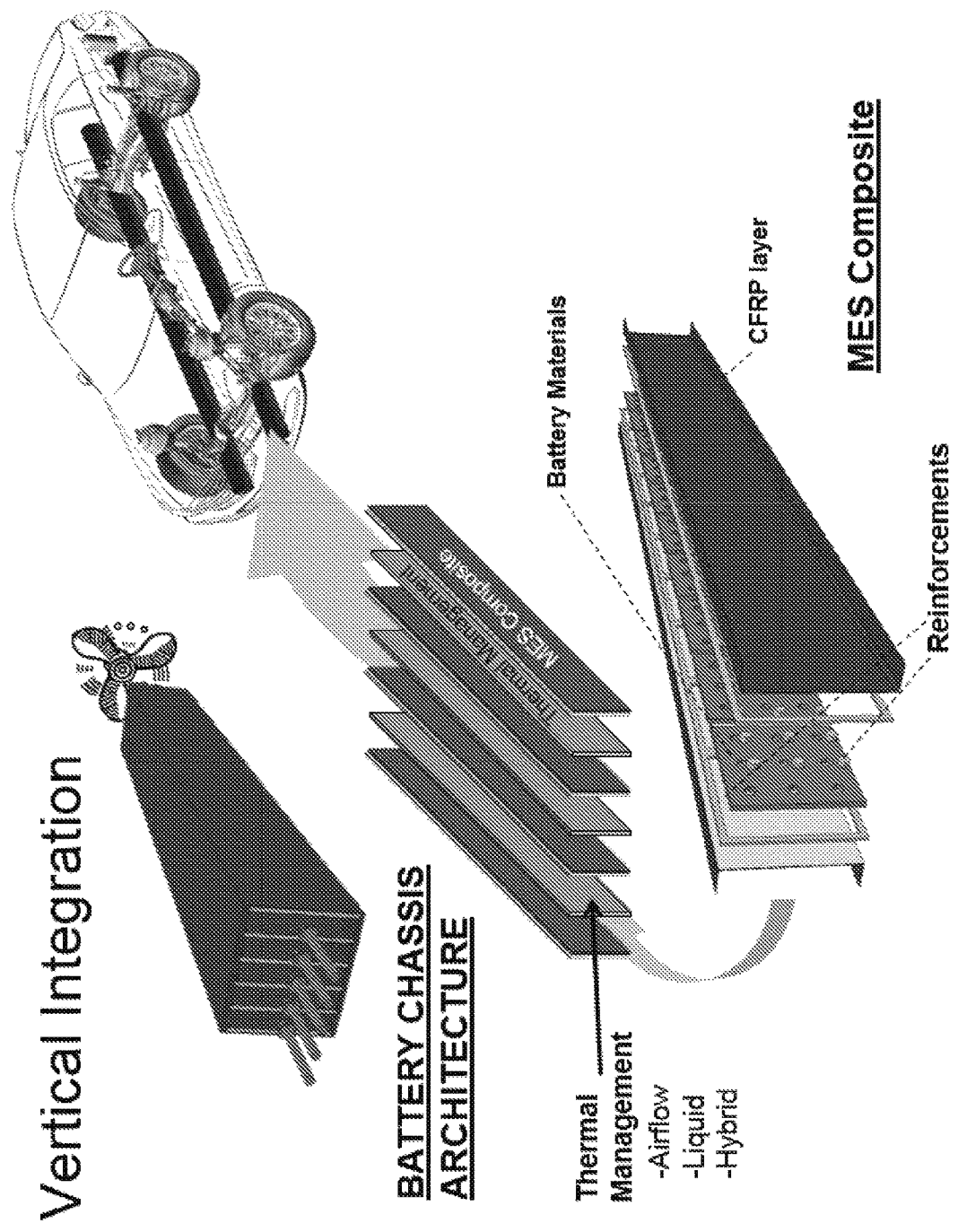
FIG. 6 shows schematically example vertical integration of the MES composites into an electric vehicle chassis.
Figure 7:
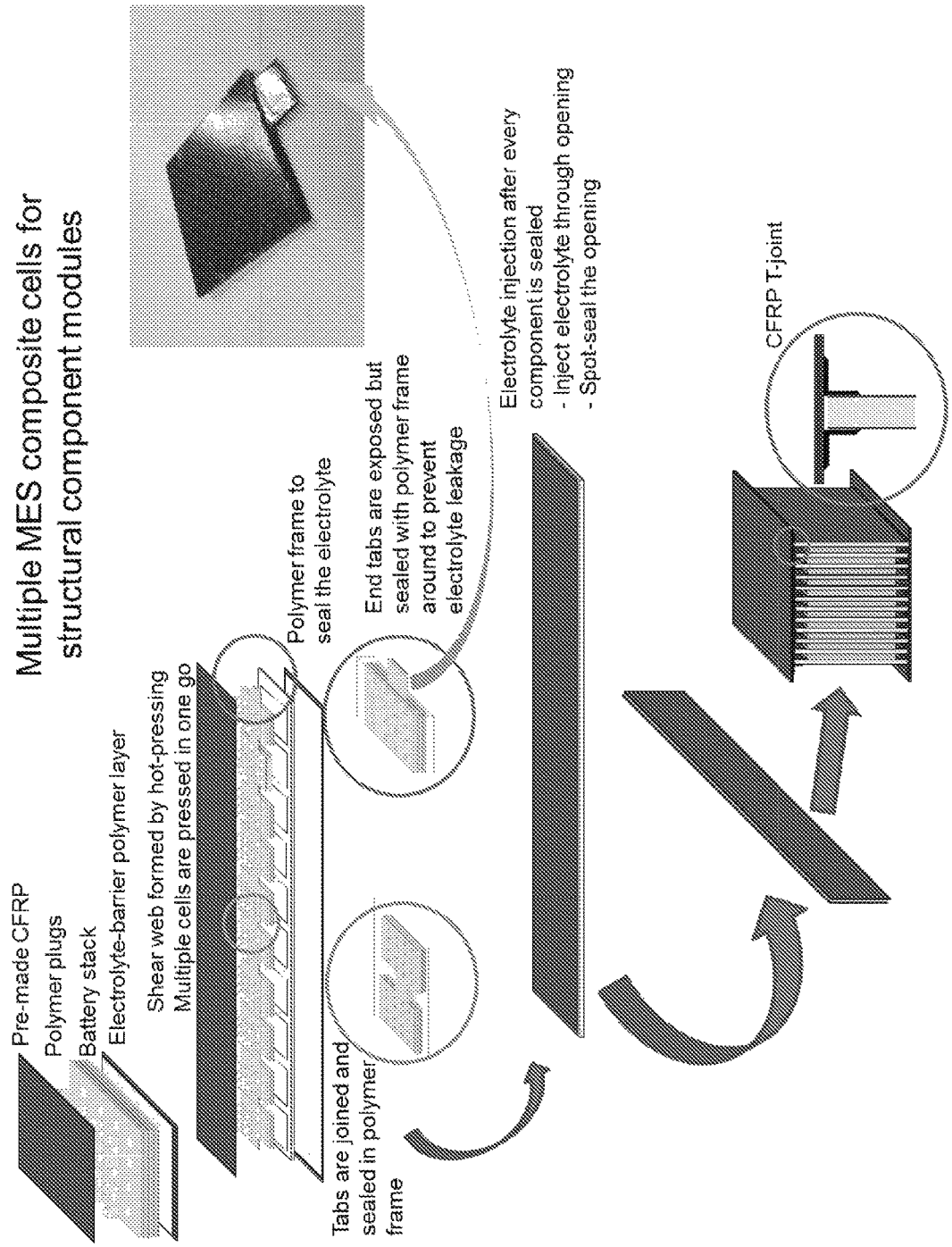
FIG. 7 shows schematically example scaling-up of the MES composites to produce an electric vehicle chassis.
Figure 8:
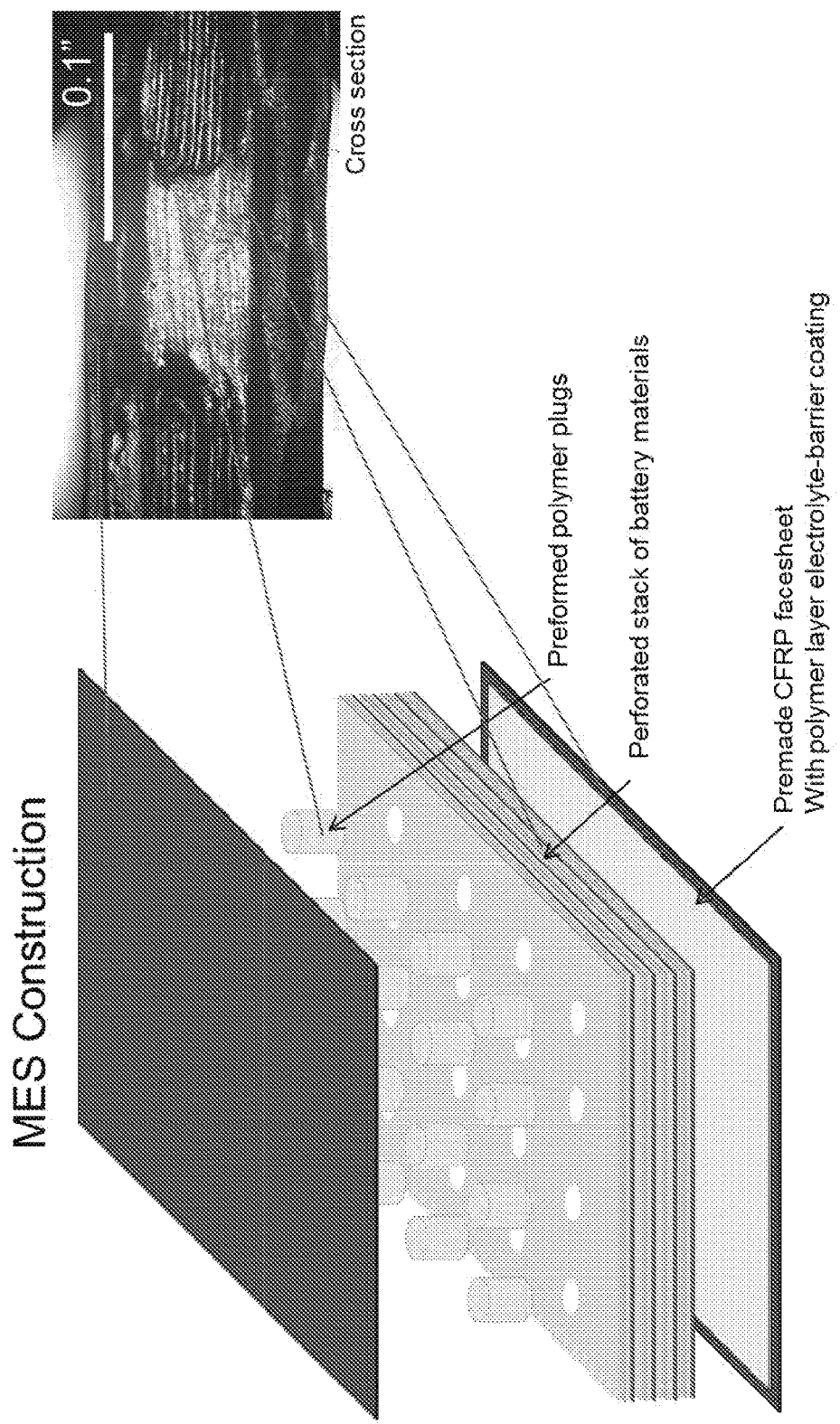
FIG. 8 shows schematically an example MES composite described herein and a cross-section image thereof.
Figure 9:
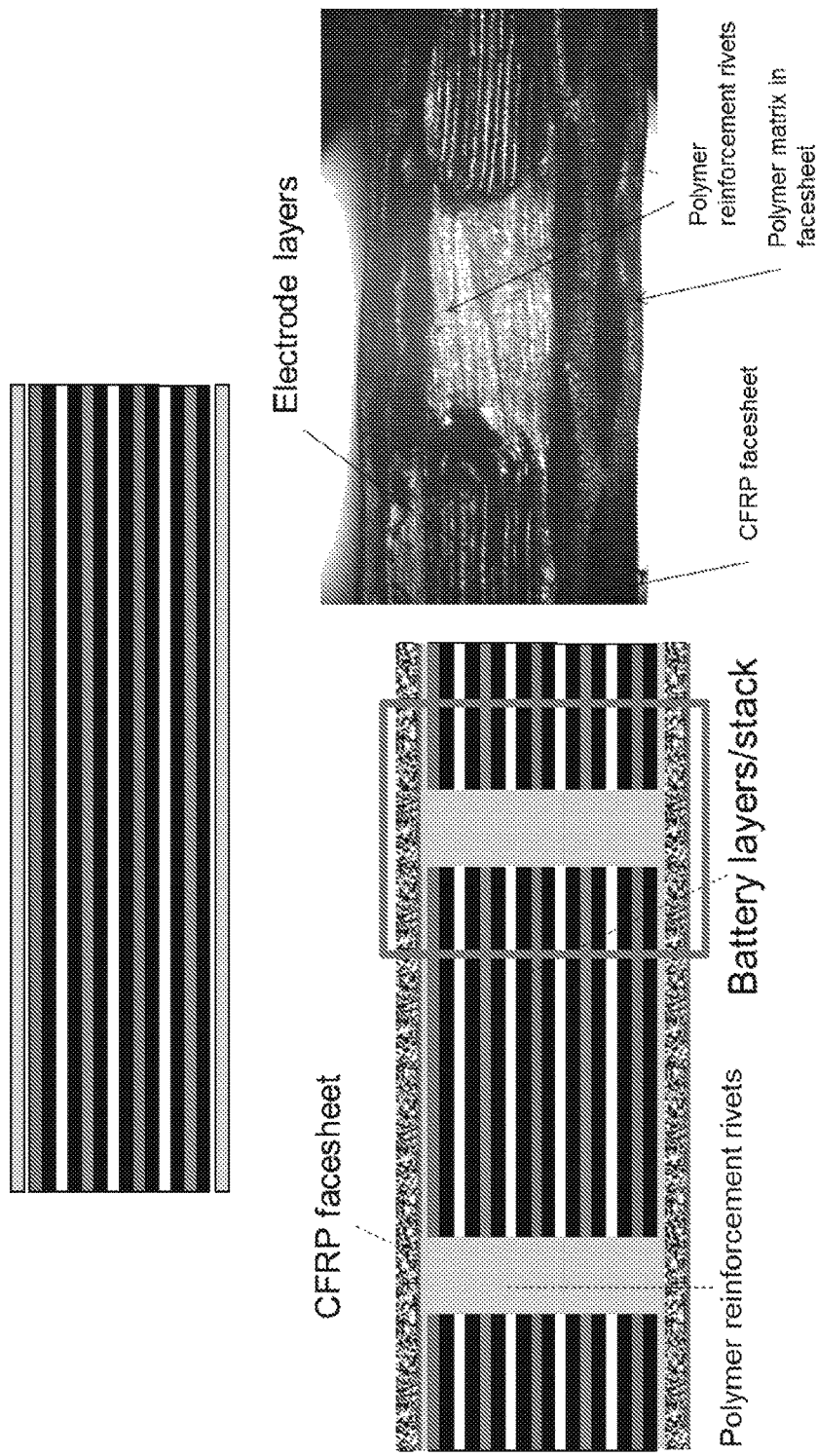
FIG. 9 shows a cross-section of an example MES composite described herein and an image thereof.

The MES composite can be scaled up into a module. In one non-limiting example, the module can be made and oriented vertically as a slab of battery module, as shown in FIG. 6. This can either serve as shear webs, or directly be used as the main bending load bearing components, because of its relative large stiffness due to the vertical orientation. FIG. 7 shows an overall approach of a system level assembly concept. The bonding joints between the top and bottom plates with the vertical shear web should provide the means of load transferring from the top and bottom plates to the shear webs, and also effectively bond the vertical slabs together to prevent individual buckling. One embodiment of the bonding joints are the CFRP T-joints illustrated in FIG. 7. Other embodiments of the bonding joints include composite plates with teeth and bolt bonding.

MES Composite.

One aspect of some embodiments of the invention relates to is an MES composite comprising (a) a stack of energy storage materials and (b) one or more structural facesheets sandwiching the stack of energy storage materials, wherein the stack of battery materials is perforated by (c) one or more reinforcements, and wherein the reinforcements are bonded to the structural facesheets. Another aspect of some embodiments of the invention relates to an MES composite comprising (a) a stack of energy storage materials, (b) one or more structural facesheets sandwiching the stack of energy storage materials, and (c) one or more reinforcements perforated by the stack of energy storage materials, wherein the reinforcements are bonded to the structural facesheets.

Figure 24:
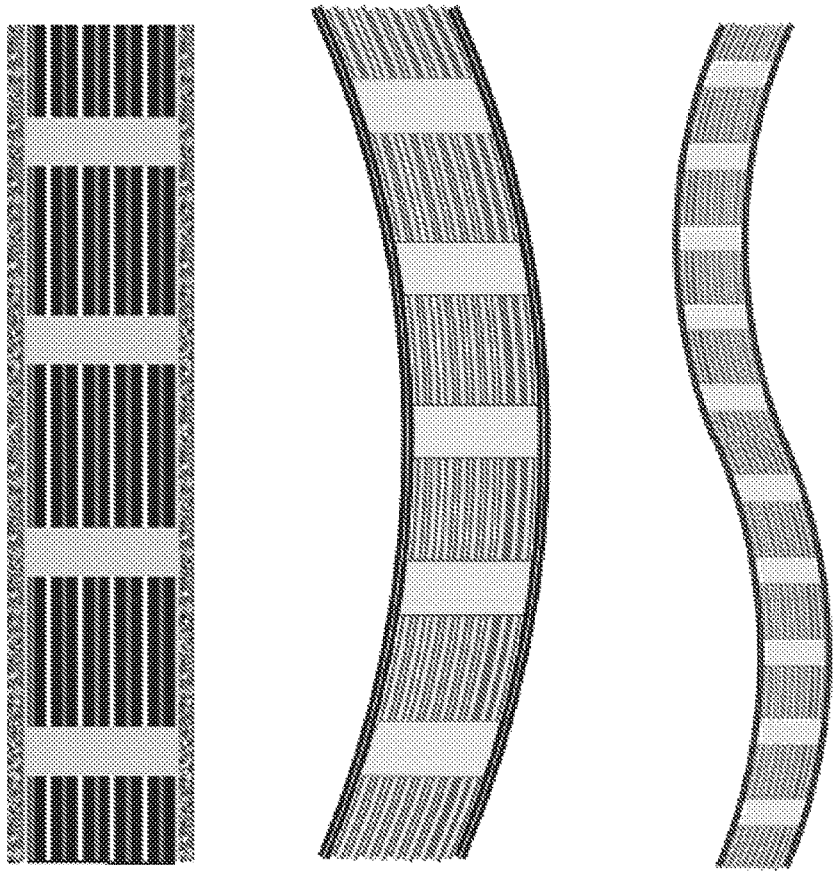
FIG. 24 shows example configurations of the MES composite. The MES composite does not need to be flat. It can be made into a curved plate, or with compound curves, or other more complex geometries. The orientation of the MES composite does not need to be horizontal. It can be oriented in any other orientations including vertical (e.g., an MES Composite rotated 0-360 degrees with respect to those shown in the figure).

The MES composite can have any orientation. For example, in one embodiment, the MES composite is arranged such that the electrode stack have a horizontal orientation. In another embodiment, however, the MES composite is arranged such that the electrode stack have a vertical orientation. In one embodiment, the MES composite is arranged such that the reinforcements have a vertical orientation. In another embodiment, however, the MES composite is arranged such that the reinforcements have a horizontal orientation. Optionally, the MES composite can be flat (planar), or made into a curved geometry, or a more complex geometry, as shown in FIG. 24.

Electrode Stack.

Figure 23:
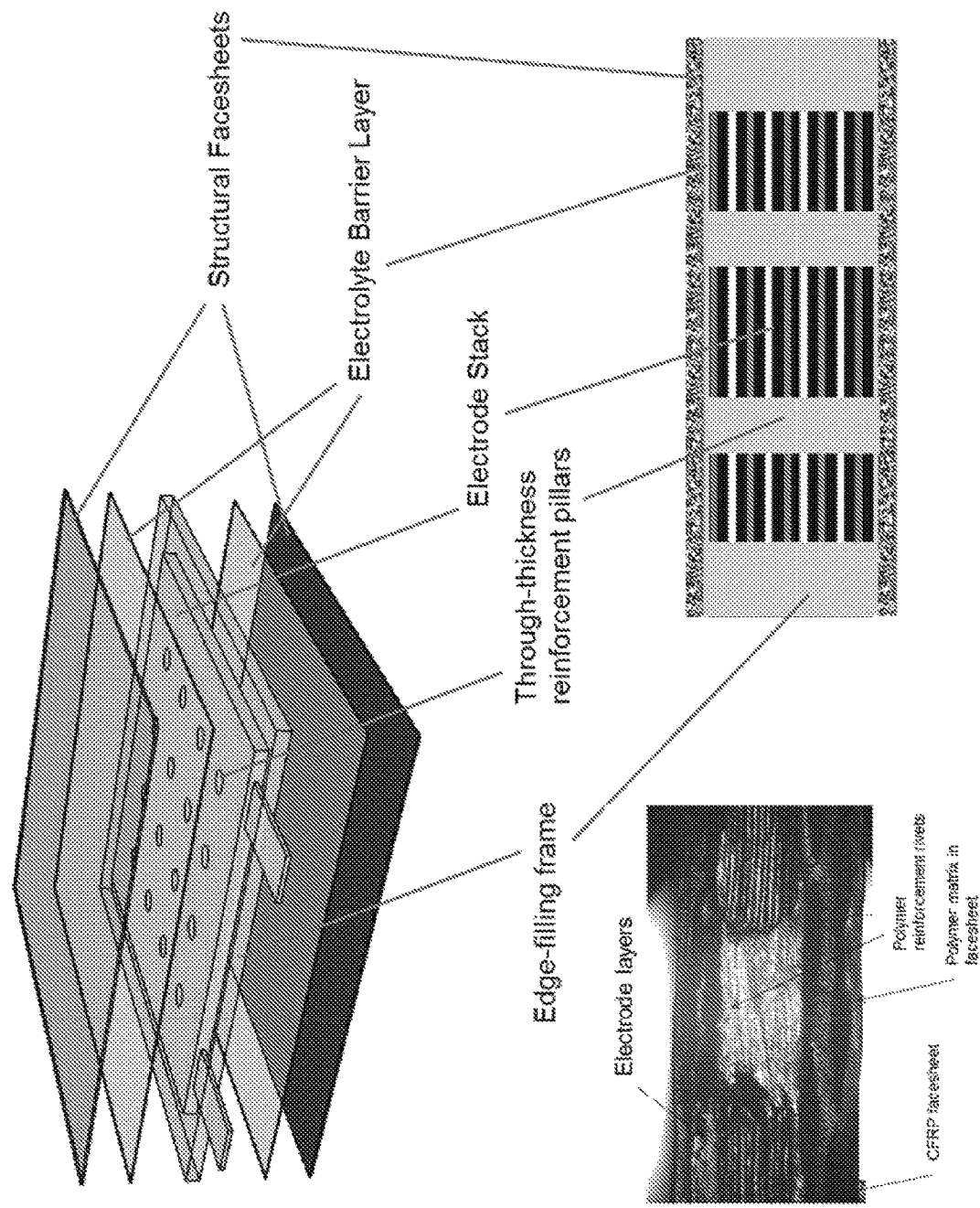
FIG. 23 shows an example configuration of the MES composite.

The MES composite can comprise an electrode stack for energy storage, as shown in FIG. 23. In one embodiment, the MES composite comprises a lithium-ion (Li-ion) battery core. In one embodiment, the MES composite comprises a non-Li-ion battery core (e.g., nickel-metal hydride (NiMH), nickel-cadmium (NiCd), alkaline cell, lithium-sulfur (Li—S), lithium-titanate (LTO), etc.) The electrode stack can also be a component of an electrochemical cell and wherein the electrochemical cell is selected from the group consisting of: a primary cell, a secondary cell (including a lithium cell, a lithium ion cell, a lead-acid cell, a zinc-carbon cell, an alkaline cell, a nickel-cadmium cell, a nickel metal hydride cell, a silver oxide cell, a sodium sulfur cell, etc.), a solid electrochemical cell, a fluid electrochemical cell, a flow battery, a fuel cell, a capacitor, a supercapacitor, a semi-solid battery, and a metal-air battery.

In embodiments, the thickness of the electrode stack core can be, for example, within the range of 10 nm to 5 cm. The electrode stack has one or more lateral dimensions between 1 cm to 20 m.

One aspect of the electrode stack described here is that the stack is perforated according to the desired placement of the through-thickness reinforcement array. Useful perforation shapes include, but are not limited to, circular, square, rectangular, and polygonal. The perforations (or holes or apertures) can be of any shapes. In one embodiment, the shape of the perforation is circular. The diameter (or lateral dimension) of the perforations can be, for example, from about 0 to about 5 cm wide. Optionally, each perforation in the electrode stack has identical or substantially identical dimensions and/or shapes. Optionally, the dimensions and/or shape of the perforations are independent. Optionally, each perforation has a lateral dimension identical, substantially identical, more than 2 times the lateral dimension of the reinforcements. The perforations can be distributed in a pre-designed pattern which can be a regular pattern, a staggered pattern, or other perforation patterns (see FIG. 25). The distance between each perforation can be, for example, between 10 nm to about 10 or about 20 times the perforation diameter. The perforations can also be conjoined, continuous, or in physical contact with each other, in any direction In some embodiments, the electrode stack comprises a plurality of electrode layers or electrode plates. The electrode layers are arranged in a substantially parallel orientation such that the each perforation of an individual electrode layer is aligned along the alignment axis passing through the perforation of each of the electrode layers.

In cases where a battery core is included, the battery core may be wetted with liquid ionic electrolyte to be functional. Thus, the external skeleton encapsulating the battery core can be adapted to contain the liquid electrolyte within the cell.

In some embodiments one or more of the electrode layers can further be substituted with an inert material selected from the group consisting of metal, glass, ceramic, dielectric materials, steel or polymer plates containing identical or substantially identical perforation patterns for providing structural integrity to the electrode stack. Or in some embodiments, the electrode stack further comprise of a plurality of individual electrode stacks. The individual electrode stacks can further be separated by a layer or a plate of metal, glass, ceramic, dielectric materials, steel or polymer.

In some embodiments, rather than having the reinforcements disposed in the perforations or apertures of the stack of energy storage materials, the reinforcements themselves can comprise an array of perforations or apertures along an alignment axis parallel to the thickness direction, wherein one or more stacks of energy storage materials are arranged such that they extend a length along an alignment axis passing through the perforations in the reinforcements.

Structural Facesheets.

Structural facesheets are thin structural layers on the outermost surface of the cell (either or both sides). This performs the structural function by providing rigidity to the MES Composites. The structural facesheets is usually a thin sheet made of structural materials. When more than one facesheets are included, the facesheets can be made of the same material or of different types of materials.

In some embodiments, the structural material is fiber-reinforced-polymers. Fiber-reinforced-polymers are polymers (matrix) that are reinforced with continuous or non-continuous fibers. Exemplary fibers include glass fibers, carbon fibers, wholly aromatic polyamide fibers (i.e., aramid fibers), polyester fibers, and natural fibers (e.g. cotton fibers) . Mixtures of different types of reinforcing fibers may also be employed. In some embodiments, the composite layer comprises woven fabric, unidirectional fibers, chopped fibers, and/or random strands of fibers. In some embodiments, the polymer matrix (which can be different from or the same as the polymer in the through-thickness reinforcements) can be thermosets due to their high elastic moduli and general temperature insensitivity, which include epoxy resins, phenolic resins, polyester resins, polyimide resins, polybenzimidazoles, polyurethanes, etc. In some embodiments, the polymer matrix can be thermoplastics, which include but not limited to, polyamides, polyoxymethylenes, polyolefins including polyethylene and polypropylene, thermoplastic polyesters, polyether ether ketone (PEEK), polyetherimide (PEI), polyethylene terephthalate (PET), etc.

Apart from fiber-reinforced-polymers, the structural facesheets can comprise at least one metal, (such as aluminum sheets, steel, iron, tungsten carbine, tungsten alloy, stainless steel, nickel, titanium, copper, brass, bronze, lead, tin, zinc, and/or other alloys), thermoset plastics (e.g., epoxy resins, phenolic resins, polyester resins, polyimide resins, polybenzimidazoles, polyurethanes, etc.), thermoplastics (e.g., polyamides, polyoxymethylenes, polyolefins including polyethylene and polypropylene, thermoplastic polyesters, polyether ether ketone (PEEK), polyetherimide (PEI), polyethylene terephthalate (PET), and their combinations or copolymers thereof etc.), ceramics (e.g. mixtures of alumina ($Al_2O_3$), silica ($SiO_2$), magnesia (MgO), zirconia ($ZrO_2$), chromium oxide ($Cr_2O_3$), iron oxide ($Fe_2O_3$), calcium oxide (CaO), silicon carbide (SiC), carbon (C)). In addition, in some embodiments, the reinforcements comprise a combination of the polymer, metal, and/or ceramic material described above.

In some embodiments, the structural facesheets further comprises a polymer coating (e.g., an electrolyte barrier layer) disposed on the surface. In some embodiments, the polymer coating comprises polyolefin (polyethylene or polypropylene), PTFE, polyester, nylon, polyamide, PVC, Polyether ether ketone (PEEK), polyetherimide (PEI), polyethylene terephthalate (PET), acrylonitrile butadiene styrene (ABS), and/or polyurethane and any copolymer of the above polymers (e.g. with functional groups such as acrylic acid, methacrylic acid, vinyl acetate, etc. with 0-100% functional group weight percentage). Other polymers that have strong adhesion to the facesheets and are inert to battery chemistry can also be used in the polymer coating.

In some embodiments, the reinforcements and the polymer coating comprise at least one common material. In some embodiments, the reinforcements and the polymer coating comprise the same material. The coating can be bonded to the surface of the structural facesheets by an intermediate adhesive layer, by fusing the same material, or by direct chemical bonding.

Similar to a sandwich structure construction, the stiff structural facesheets are thin structural plates placed on either or both sides of the electrode stack, separated by the stack thickness, to carry the bending moment. This increases the moment of inertia of the laminate, resulting in a higher bending rigidity. The structural facesheets can have a thickness of about 0 to about 20 millimeters, and have one or more lateral dimensions between 1 cm to 20 m.

Reinforcements.

Through-thickness reinforcements can extend through the perforations in the electrode stack and mechanically link the two structural facesheets together, as shown in FIG. 23.

The through-thickness reinforcements allow load transfer between the two facesheets and inhibit the relative slipping between the adjacent electrode layers. This significantly increases the stiffness and strength of the MES Composites over conventional electrochemical devices and batteries (for example, lithium ion batteries) as the entire laminate is able to bend about a common neutral axis.

In some embodiments, the reinforcements comprise a polyolefin class polymer (polyethylene, polypropylene, and copolymers thereof including ethylene co-methacrylic acid and ethylene co-acrylic acid, and ethylene co-vinyl acetate, etc.). The acid copolymers can be neutralized with zinc or sodium salts. In some embodiments, the polymer is selected from polytetrafluoroethylene sold under the trademark TEFLON, polyoxymethylene sold under the trademark DELRIN, poly-oxydiphenylene-pyromellitimide sold under the trademark KAPTON, polytetrafluoroethylene (PTFE), perfluoroalkoxy (PFA), fluorinated ethylene propylene (FEP), polypropylene (PP), polyethylene (PE), Polyvinylidene fluoride (PVDF), polyether ether ketone (PEEK), polyetherimide (PEI), polyethylene terephthalate (PET), acrylonitrile butadiene styrene (ABS), polyester, polyamide, silicone and/or combinations thereof.

In some embodiments, the reinforcements comprise at least one fiber-reinforced polymer, wherein the fiber-reinforced polymer comprises fibers selected from the group consisting of carbon fibers, glass fibers, and aramid fibers sold under the trademark KEVLAR, and wherein the polymer comprises a thermoset or thermoplastic.

In some embodiments, the reinforcements comprise at least one metal, such as aluminum sheets, steel, iron, tungsten carbine, tungsten alloy, stainless steel, nickel, titanium, copper, brass, bronze, lead, tin, zinc, and/or other alloys. In some embodiments, the reinforcements comprise at least one ceramic material, such as aluminum oxide, silicon carbide, and/or silicon oxide. In addition, in some embodiments, the reinforcements comprise a combination of the polymer, metal, and/or ceramic material described above.

In some embodiments, the reinforcements comprise the composites of at least one of the above materials with at least one of the following additives: plastics, ceramics, firebrick, refractory material, castable refractories, refractory brick, mixtures of alumina ($Al_2O_3$), silica ($SiO_2$), magnesia (MgO), zirconia ($ZrO_2$), chromium oxide ($Cr_2O_3$), iron oxide ($Fe_2O_3$), calcium oxide (CaO), silicon carbide (SiC), carbon (C), metallic materials, plain carbon steels, alloy steels, manganese, silicon, nickel, chromium, molybdenum, tungsten, cobalt, etc.

Figure 25:
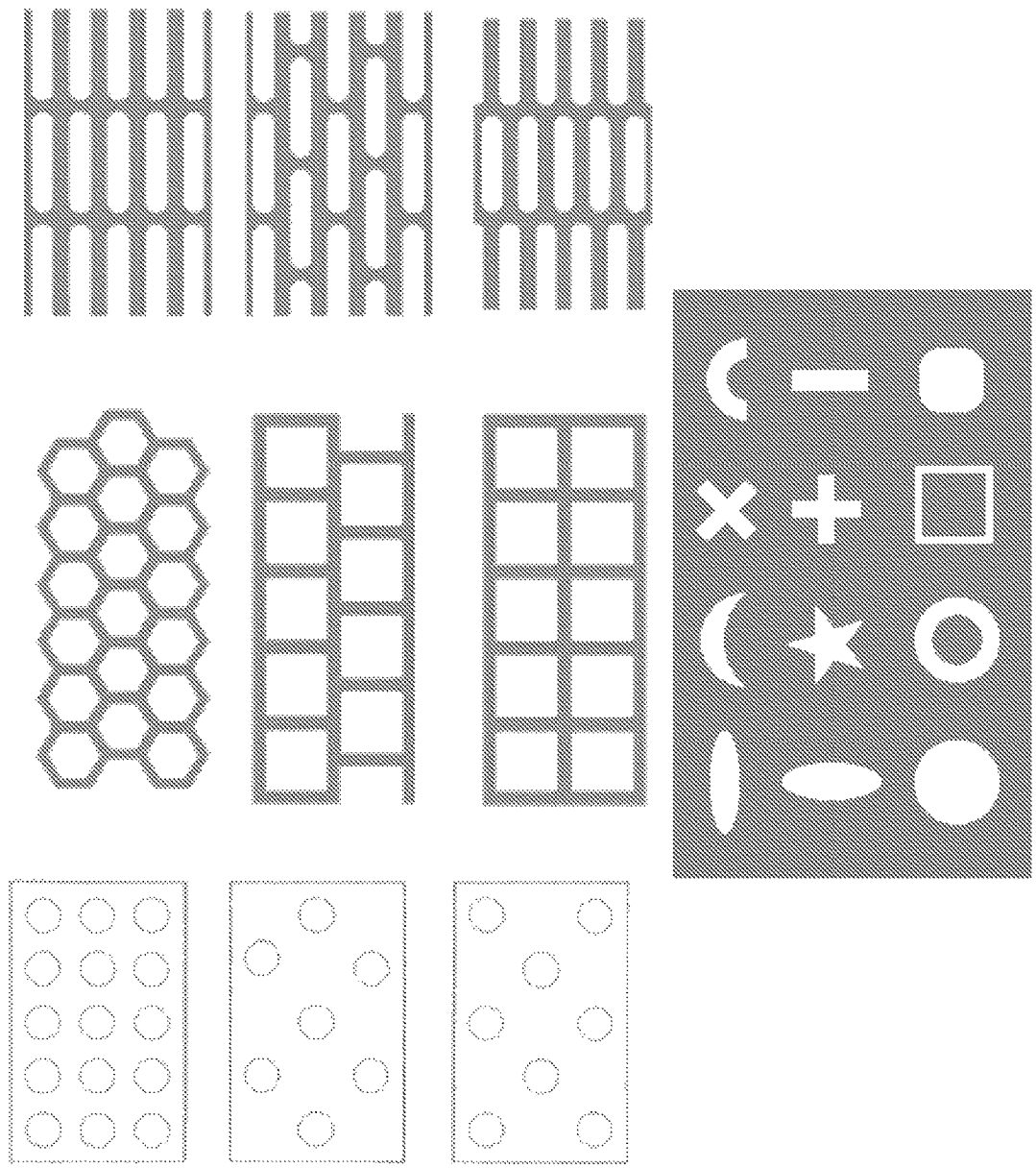
FIG. 25 shows example perforation patterns of electrode stacks and reinforcement structures.
Figure 26:
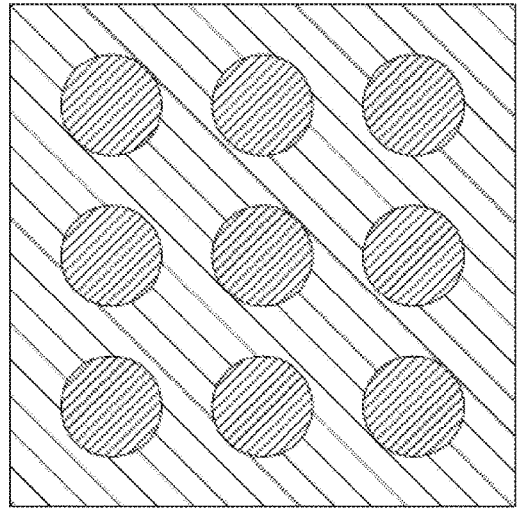
FIG. 26 shows example perforation patterns of electrode stacks and reinforcement structures.
Figure 26:
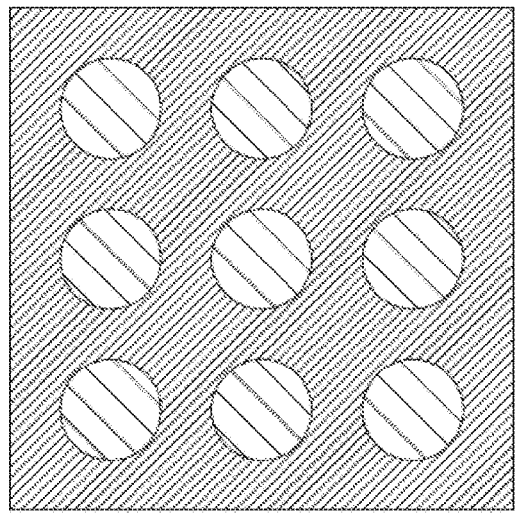
Figure 27:
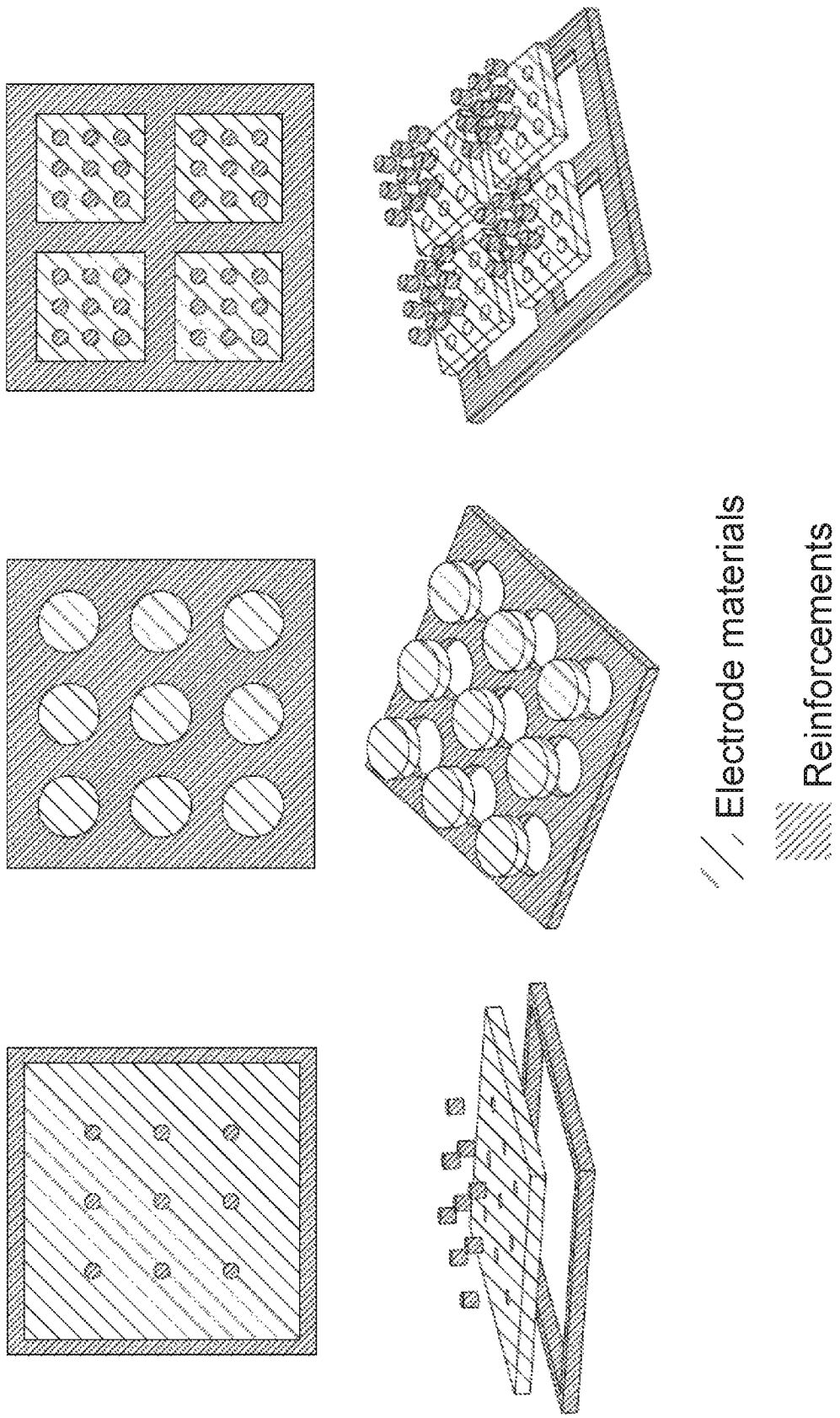
FIG. 27 shows example perforation patterns of electrode stacks and reinforcement structures.
Figure 28:
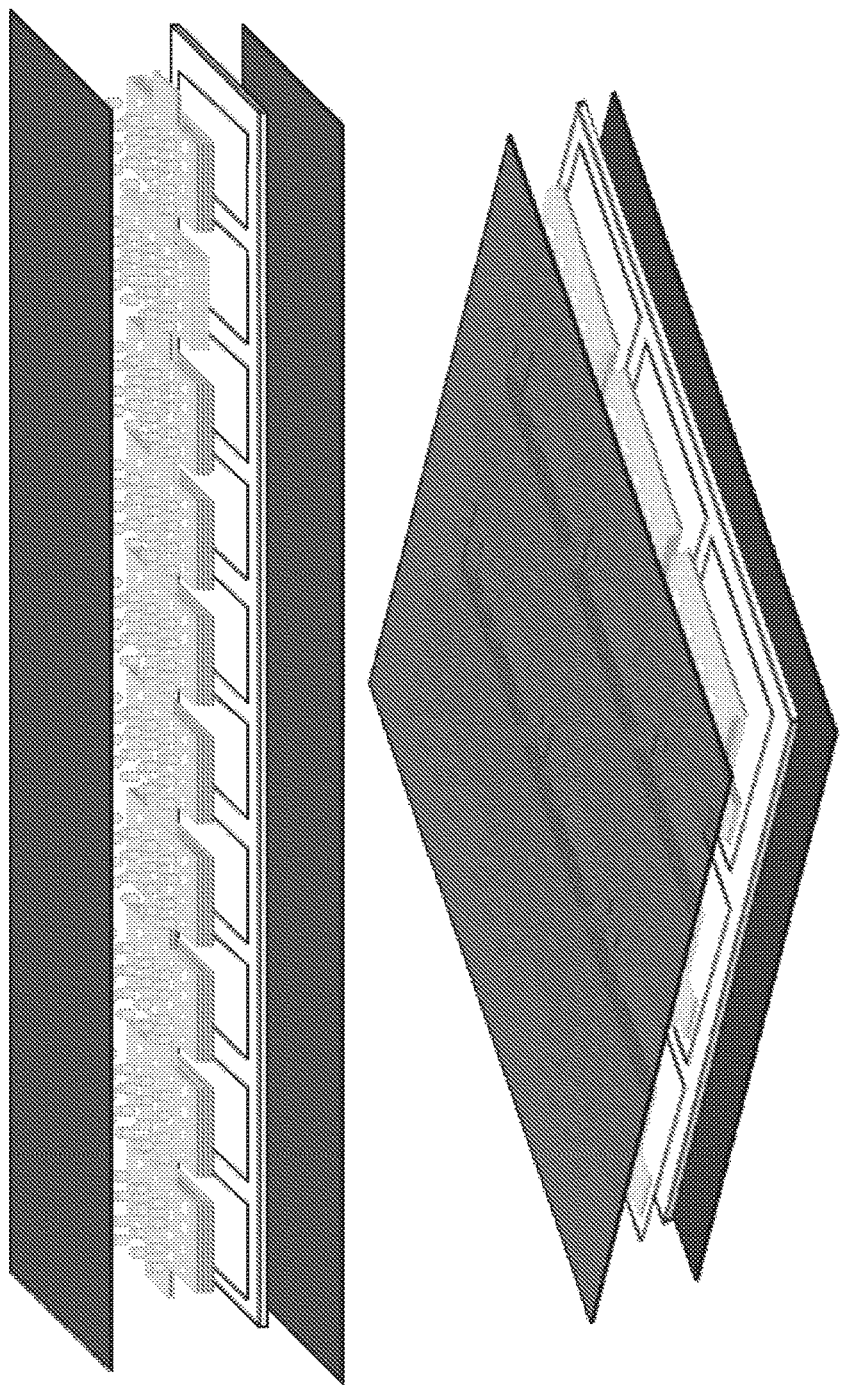
FIG. 28 shows compound reinforcements (multi-stage reinforcements) for the MES composites. The first-tier/outer reinforcement has an array of openings. The openings are filled with electrode materials which contain an array of perforations. The perforations in each electrode stack are subsequently filled with second-tier/inner reinforcements. The reinforcements and the electrode stacks are sandwiched between two structural facesheets.

The reinforcements can be made with a variety of geometries and physical dimensions. The reinforcements are generally cylindrical in shape. The diameter of the pillars can be from 0.5 mm up to 20 mm or more. The height of these cylinders basically is the thickness of the electrode stack. The cross section of the polymer pillars do not have to be circular, e.g., they do not have to be cylindrical in shape, and can have other polygonal or non-polygonal shapes. Example cross-sections of the reinforcements are shown in FIGS. 25-27. Optionally, the dimensions of each reinforcement structure can be identical, substantially identical, or independent.

Either end of the reinforcements (in the thickness direction) can be bonded to the inside surface of the structural facesheets (or on the coating of the facesheets), by an intermediate adhesive layer, by fusing the same material, or by direct chemical bonding. The bonding between the reinforcements and the facesheets allow load transfer between the two facesheets, and the presence of the reinforcements anchors the electrode layers, resulting in an increase in the stiffness and strength of the complete device.

In some embodiments of the invention, rather than having the reinforcements disposed in the perforations or apertures of the stack of energy storage materials, the reinforcements themselves can comprise an array of openings, perforations or apertures, wherein one or more stacks of energy storage materials are arranged or disposed inside those openings.

The reinforcements can also be hollow or concentric, such as a thin-walled cylinder instead of a solid cylinder. Through the aperture in hollow reinforcements, multifunctionalities can be added, including (a) electrolyte filling, (b) thermal management and communication, through a heat sink or a heat source to control the temperature, (c) filling of actuator or transducer materials, which can be deformed according to changed shapes of the reinforcements, (d) sensors to monitor the state of batteries (such as pressure, temperature, etc.), and/or (e) cables or conduits for signal transmissions, electrical conduction, etc.

In some embodiments, one or more reinforcements further contain a thermal device (see FIG. 30A), such as a heat sink or a heat source, or a heat pipe, or heat transfer rods arranged such that each heat transfer rod extends a length along an alignment axis passing through the perforations in the electrode stack, and wherein the heat transfer rods are positioned in thermal communication with a heat sink or a heat source.

In some embodiments, one or more reinforcements further contain a dielectric or an inert coating on a surface (see FIG. 30B), thereby preventing a reaction from occurring at the reinforcements.

In some embodiments, one or more reinforcements further comprises a group of reinforcements (see FIG. 30C), wherein the group of reinforcements are arranged such that they extend a length along an alignment axis passing through the perforations in the electrode stack.

In some embodiments, one or more reinforcements further comprise of a porous rod; or wherein one or more reinforcements comprises a hollow rod with porous walls (see FIG. 30D); or wherein the reinforcements are a plurality of tubes arranged along an alignment axis passing through the perforations in the electrode stack.

In some embodiments, one or more porous reinforcements; or the interior of one or more hollow reinforcements; or within each tube is filled with: a fluid, a liquid electrolyte, a fuel fluid, an aqueous solution, a gas (such as oxygen), a thermal-management substance, etc. The fluid, liquid electrolyte, aqueous solution or gas flows through the porosity, the interior, or through the tubes along an alignment axis passing through the perforations in the electrode stack.

In some embodiments, one or more reinforcements further comprises of actuator or transducer materials or devices consisting of at least a device selected from the group consisting of: electromagnetic devices, electrochemical devices, electromechanical devices, electroacoustic devices, electrostatic devices, thermoelectric devices, and radio acoustic devices.

Figure 30:
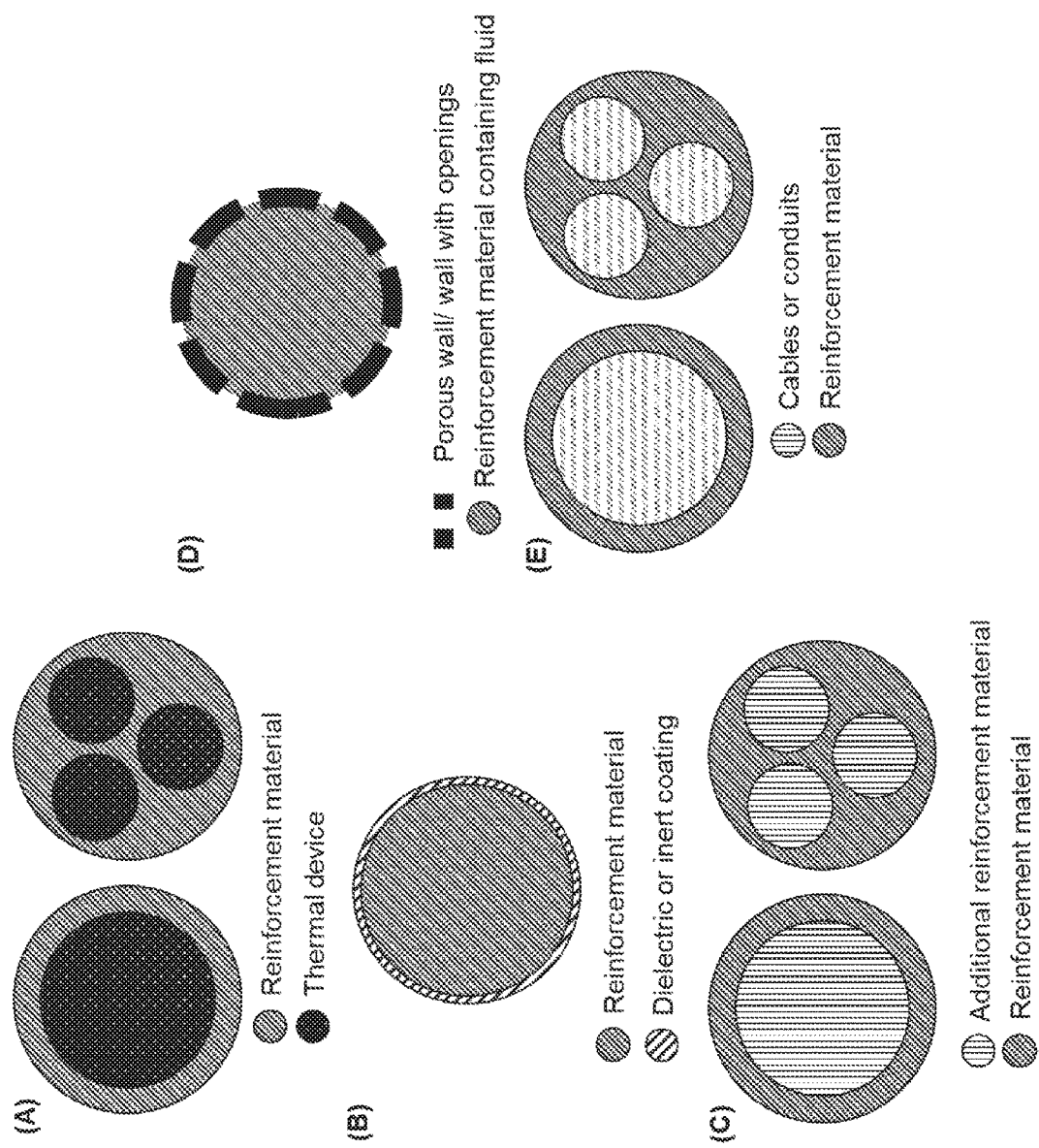
FIG. 30 shows cross-sectional view of example reinforcement structures.

In some embodiments, one or more reinforcements further comprises of cables of conduits for electrical signal transmission and electrical conduction (see FIG. 30E).

In some embodiments, one or more reinforcements further comprises on at least one sensor selected from the group consisting of: strain gauges, thermocouples, thermistors, pressure sensors, tactile sensors, piezoelectric sensors, voltage sensors, current sensors, humidity sensors, etc.

Reinforcement Frame/Edge-Filling Frame.

In some embodiments, MES composite can further comprise an edge-filling frame, as shown in FIG. 23. The edge-filling frame encapsulates the battery core and the liquid electrolyte in the lateral direction. It prevents the electrolyte from escaping through the edges. Also the edge-filling frame enhances the mechanical properties by constraining the edges of the MES composite cells.

In some embodiments, the edge-filling frame comprises a polyolefin class polymer (polyethylene, polypropylene, and copolymers thereof), including ethylene co-methacrylic acid and ethylene co-acrylic acid, and ethylene co-vinyl acetate. The acid copolymers can be neutralized with zinc or sodium salts. In some embodiments, the polymer is selected from polytetrafluoroethylene sold under the trademark TEFLON, polyoxymethylene sold under the trademark DELRIN, poly-oxydiphenylene-pyromellitimide sold under the trademark KAPTON, polytetrafluoroethylene (PTFE), perfluoroalkoxy (PFA), fluorinated ethylene propylene (FEP), polypropylene (PP), polyethylene (PE), polyvinylidene fluoride (PVDF), polyether ether ketone (PEEK), polyetherimide (PEI), polyethylene terephthalate (PET), acrylonitrile butadiene styrene (ABS), polyester, polyamide, silicone and/or their combinations or copolymers thereof.

In some embodiments, the edge-filling frame comprises the composites of at least one of the above polymers with at least one of the following additives: plastics, ceramics, firebrick, refractory material, castable refractories, refractory brick, mixtures of alumina ($Al_2O_3$), silica ($SiO_2$), magnesia (MgO), zirconia ($ZrO_2$), chromium oxide ($Cr_2O_3$), iron oxide ($Fe_2O_3$), calcium oxide (CaO), silicon carbide (SiC), carbon (C), metallic materials, plain carbon steels, alloy steels, manganese, silicon, nickel, chromium, molybdenum, tungsten, cobalt, etc.

Polymer Coating/Electrolyte Barrier Layer.

In some embodiments, the structural facesheets further comprises a thin electrolyte barrier layer disposed on the surface, as shown in FIG. 23, though the MES composite can be made without an electrolyte barrier layer. Specifically, if the facesheet has the following characteristics of the barrier layer, the electrolyte barrier layer can be omitted.

In some embodiments, the electrolyte barrier layer is essentially a thin sheet of an insulating, inert material, preferably of the same polymer type as the reinforcements, bonded to the inside surface of the facesheet (the side facing the battery core). This thin sheet serves as (a) a barrier to prevent the electrolyte from escaping in the thickness direction; (b) a mechanical link between the facesheet and the reinforcements—because this sheet rigidly bonds to the facesheet and it is the same type of material as the reinforcements, they can be melt-bonded altogether. Optionally, the electrolyte barrier layer can bonded to the surface of the structural facesheets by an intermediate adhesive layer, by fusing the same material, or by direct chemical bonding.

In some embodiments, the electrolyte barrier layer comprises a polyolefin class polymer (polyethylene, polypropylene, and copolymers thereof), including ethylene co-methacrylic acid and ethylene co-acrylic acid, and ethylene co-vinyl acetate. The acid copolymers can be neutralized with zinc or sodium salts. In some embodiments, the polymer is selected from polytetrafluoroethylene sold under the trademark TEFLON, polyoxymethylene sold under the trademark DELRIN, poly-oxydiphenylene-pyromellitimide sold under the trademark KAPTON, polytetrafluoroethylene (PTFE), perfluoroalkoxy (PFA), fluorinated ethylene propylene (FEP), polypropylene (PP), polyethylene (PE), polyvinylidene fluoride (PVDF), polyether ether ketone (PEEK), polyetherimide (PEI), polyethylene terephthalate (PET), acrylonitrile butadiene styrene (ABS), polyester, polyamide, silicone and/or their combinations or copolymers thereof.

In some embodiments, the electrolyte barrier layer comprises the composites of at least one of the above polymers with at least one of the following additives: plastics, ceramics, firebrick, refractory material, castable refractories, refractory brick, mixtures of alumina ($Al_2O_3$), silica ($SiO_2$), magnesia (MgO), zirconia ($ZrO_2$), chromium oxide ($Cr_2O_3$), iron oxide ($Fe_2O_3$), calcium oxide (CaO), silicon carbide (SiC), carbon (C), metallic materials, plain carbon steels, alloy steels, manganese, silicon, nickel, chromium, molybdenum, tungsten, cobalt, etc.

Assembling the MES Composite.

The MES composite can be assembled by first providing an electrode stack, wherein the electrode stack includes an array of perforations or apertures. In case the electrode stack comprises a plurality of electrode plates, the plurality of the electrode layers can be arranged in a substantially parallel orientation such that each perforation of an individual electrode layer is aligned along an alignment axis passing through a perforation of each of all other electrode layers. Second, one or more reinforcements can be provided and arranged such that each reinforcement extends a length along an alignment axis passing through a perforation in the electrode stack. Third, structural facesheets can be provided and arranged to sandwich the electrode stack, wherein the structural facesheets are attached to the ends of the reinforcements.

Non-limiting processes for assembling the MES composites are provided in the working examples.

Applications of the MES Composite.

Another aspect of some embodiments the invention relates to the use of the MES composite as a structural component for an electrical device or an electric system.

Structural components integrated with the MES composite described herein can also be used in a multitude of applications, such as construction, aerospace applications, aircraft, maritime, and other energy-related industries.

In one non-limiting example, the MES composite is incorporated in a structural component (e.g., chassis) of an electric vehicle. In some embodiments, the electric vehicle is an automobile. In some embodiments, the electric vehicle is an unmanned aerial vehicle. Multifunctional energy storage designs help reduce the effective weight of an EV energy storage system. If the vehicle level specific energy requirements are assumed to be the same, the reduction in protection/control overhead with the multifunctional battery relaxes the need for a high cell level specific energy. The weight reduction comes from the fact that the structural members of an electric vehicle, protective elements such as protections for battery cells, and the battery can be replaced with the multifunctional battery. The saving can be calculated by comparing the total weight of the structural members, protective elements, and batteries of a conventional EV to the weight of the multifunctional battery. In this case, the multifunctional battery is scaled so that it can perform a same or similar structural function and stores a same or similar energy as that in a conventional EV.

In some embodiments, the electric device or electric system further comprises one or more thermal management modules. In some embodiments, the thermal management modules comprise liquid for thermal management. In some embodiments, the thermal management modules comprise air flow for thermal management. In some embodiments, the thermal management modules comprise phase-changing materials for thermal management.

In some embodiments of the electric device or electric system, the MES composites and the thermal management modules are anchored perpendicularly on at least one mounting panel. In some embodiments, the MES composites and the thermal management modules can be parallel to each other. In some embodiments, the mounting panel comprises a plurality of T-shaped joints for anchoring the MES composites and the thermal management modules. In some embodiments, the T-shaped joints comprise CFRP materials.

In some embodiments, the electric device or electric system further comprises at least one sensor. In some embodiments, the electric device or electric system comprises a piezoelectric sensor for impact detection. In some embodiments, the electric device or electric system comprises a temperature sensor for monitoring battery temperature. In some embodiments, the electric device or electric system comprises an electrical sensor for monitoring electrical connection.

As will be understood by one of skill in the art, the figures provided are illustrative of embodiments of the invention. Unless otherwise indicated, the dimensions shown in the figures are not intended to be to scale. Orientations of embodiments shown include both horizontal and vertical orientations. That is, although the figure may show one orientation, other orientations (e.g., rotated 0-360°) are also included.

ADDITIONAL NON-LIMITING EMBODIMENTS

Embodiment 1

A multifunctional energy storage (MES) composite comprising (a) a stack of energy storage materials and (b) one or more structural facesheets sandwiching the stack of energy storage materials, wherein the stack of energy storage materials is perforated by and anchored on (c) one or more reinforcements, and wherein the structural facesheets comprise a composite layer and optionally a polymer coating disposed on the composite layer.

Embodiment 2

A MES composite comprising (a) a stack of energy storage materials, (b) one or more structural facesheets sandwiching the stack of energy storage materials, and (c) one or more reinforcements perforated by the stack of energy storage materials, and wherein the structural facesheets comprise a composite layer and optionally a polymer coating disposed on the composite layer.

Embodiment 3

The MES composite of Embodiment 1 or 2, wherein the structural facesheets comprise a carbon-fiber-reinforced-polymer (CFRP) layer as the composite layer.

Embodiment 4

The MES composite of Embodiment 3, wherein the CFRP layer comprises woven carbon fabric.

Embodiment 5

The MES composite of Embodiment 3, wherein the CFRP layer comprises epoxy resin.

Embodiment 6

The MES composite of Embodiment 5, wherein the epoxy resin is obtained by reacting diglycidyl ether of bisphenol A with triethyltetramine.

Embodiment 7

The MES composite of Embodiment 1 or 2, wherein the facesheets, apart from comprising a composite layer, can comprise at least one material selected from the group consisting of metals, metal alloys, thermoset plastics, and thermoplastics.

Embodiment 8

The MES composite of Embodiment 1 or 2, wherein the polymer coating comprises at least one polymer selected from the group consisting of polyolefin (e.g. polyethylene, polypropylene, and copolymers such as poly(ethylene-co-methacrylic acid), poly(ethylene-co-vinyl acetate), or poly(ethylene-co-acrylic acid)), polytetrafluoroethylene sold under the trademark TEFLON, polyoxymethylene sold under the trademark DELRIN, poly-oxydiphenylene-pyromellitimide sold under the trademark KAPTON, perfluoroalkoxy, fluorinated ethylene propylene, polyvinylidene fluoride, polyetherimide, polyether ether ketone, polyethylene terephthalate, polyester, polyamide, silicone, co-polymers of the above and/or combinations thereof.

Embodiment 9

The MES composite of Embodiment 8, wherein the polymer coating comprises a composite of the polymer and at least one additive, wherein the additive is selected from the group consisting of plastics, ceramics, firebrick, refractory material, carbon, silicon, silica, silicon carbide, metals, metal oxides, and metal alloys.

Embodiment 10

The MES composite of Embodiment 1 or 2, wherein the reinforcements comprise at least one polymer selected from the group consisting of polyolefin (e.g. polyethylene, polypropylene, and copolymers such as poly(ethylene-co-methacrylic acid), poly(ethylene-co-vinyl acetate), or poly(ethylene-co-acrylic acid)), polytetrafluoroethylene sold under the trademark TEFLON, polyoxymethylene sold under the trademark DELRIN, poly-oxydiphenylene-pyromellitimide sold under the trademark KAPTON, perfluoroalkoxy, fluorinated ethylene propylene, polyvinylidene fluoride, polyetherimide, polyether ether ketone, polyethylene terephthalate, polyester, polyamide, silicone, co-polymers of the above and/or combinations thereof.

Embodiment 11

The MES composite of Embodiment 10, wherein the reinforcements comprise a composite of the polymer and at least one additive, wherein the additive is selected from the group consisting of plastics, ceramics, firebrick, refractory material, carbon, silicon, silica, silicon carbide, metals, metal oxides, and metal alloys.

Embodiment 12

The MES composite of Embodiment 1 or 2, wherein the reinforcements and the polymer coating comprise at least one common polymer, and wherein the reinforcements are fused to the polymer coating.

Embodiment 13

The MES composite of Embodiment 1 or 2, where the energy storage materials comprise lithium-ion batteries.

Embodiment 14

The MES composite of Embodiment 1 or 2, where the energy storage materials optionally comprise a electrochemical cells such as a primary cell, a secondary cell (including a lithium cell, a lithium ion cell, a lead-acid cell, a zinc-carbon cell, an alkaline cell, a nickel-cadmium cell, a nickel metal hydride cell, a silver oxide cell, a sodium sulfur cell, etc.), a solid electrochemical cell, a fluid electrochemical cell, a flow battery, a fuel cell, a capacitor, a supercapacitor, a semi-solid battery, and a metal-air battery.

Embodiment 15

The MES composite of Embodiment 1 or 2, further comprising a reinforcement frame disposed along the lateral perimeter of the stack.

Embodiment 16

The MES composite of Embodiment 15, wherein the reinforcement frame, reinforcements and the polymer coating (or the facesheets themselves) comprise at least one common polymer, and wherein the reinforcements are fused to the polymer coating (or the facesheets themselves).

Embodiment 17

The MES composite of Embodiment 15, wherein the reinforcement frame, the polymer coating, the reinforcements, and facesheets are bonded by an intermediate adhesive layer, by fusing the same material, or by direct chemical bonding.

Embodiment 18

An energy storage device comprising the MES composite of any of Embodiments 1-17.

WORKING EXAMPLES

Example 1—MES Composite Li-ion Cells

Figure 11:
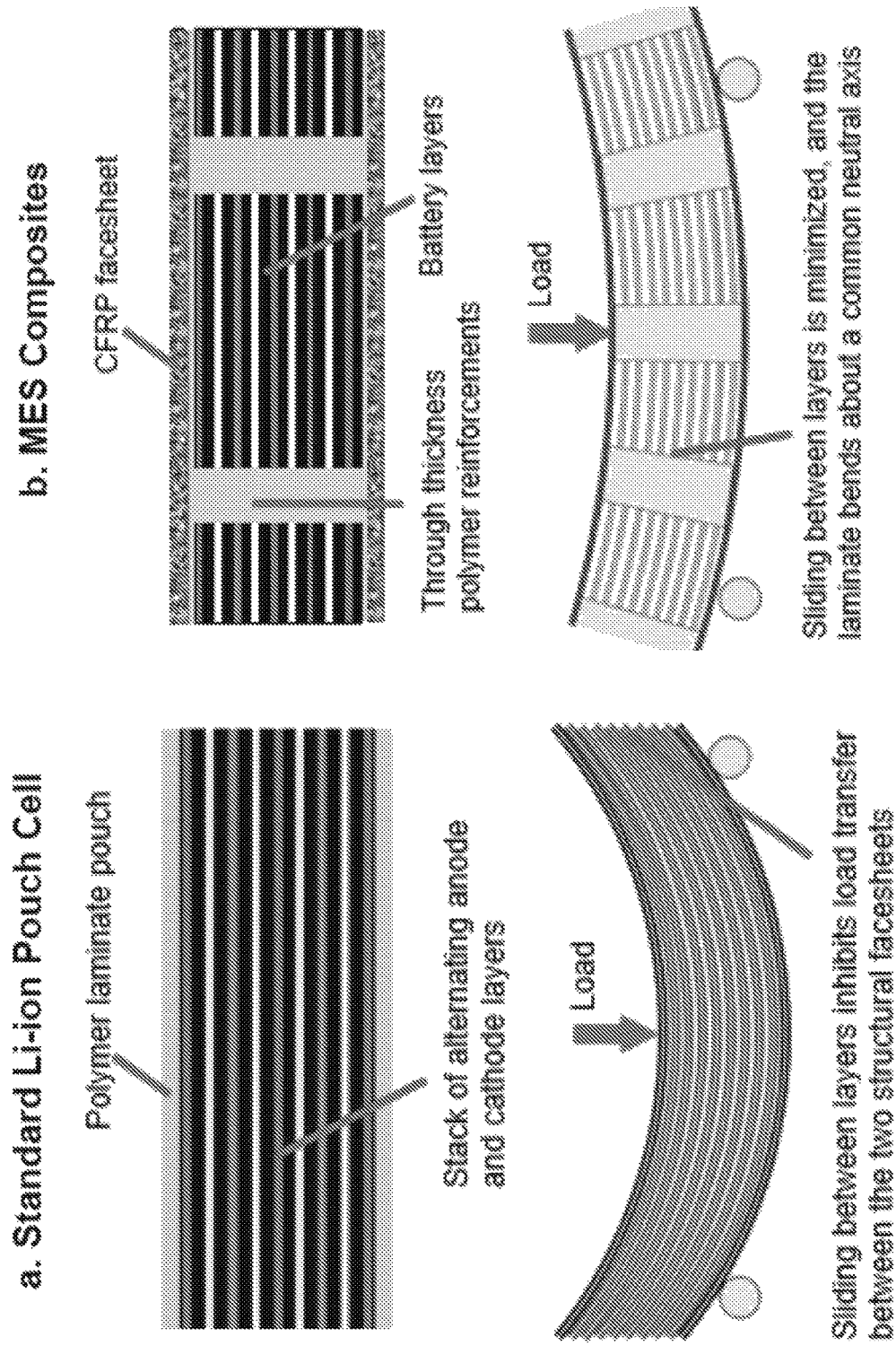
FIG. 11 shows comparison between (a) standard Li-ion pouch cells and (b) MES composites. MES composites employ through-thickness reinforcements which transfer mechanical loads between two structural facesheets and improve shear resistance of the battery core.

State-of-the-art automotive Li-ion pouch cells contain a stack of thin anode and cathode layers, arranged in an alternating fashion. Each adjacent electrode pair is separated by a thin polymer separator membrane (FIG. 11a). The stack is packaged in a thin aluminum-polymer-laminate pouch, filled with organic liquid electrolyte, and vacuum-sealed. The individual layers are loose, i.e. mechanical linkage is not present between the layers. Thus load transfer through the cells is minimal if any. Conventional Li-ion pouch batteries are not designed to carry mechanical loads, which might cause excessive relative sliding between the layers and short-circuit the cell.

The MES Composite Li-ion cells encapsulates lithium-ion battery materials inside structural carbon-fiber-reinforced-polymers (CFRP) 'facesheets' (FIG. 11b). The energy-storage component of the MES Composites is standard automotive Li-ion battery active materials. Instead of using the standard aluminum-laminate packaging, the MES Composites also uses the CFRP facesheets to contain the electrodes and the liquid electrolyte.

Similar to a sandwich structure construction, the stiff, structural CFRP facesheets are placed on either side of the electrode stack, separated by the stack thickness, to carry the bending moment. This increases the moment of inertia of the laminate, resulting in a higher bending rigidity. However, without the interlayer shear resistance of the battery core, the thin battery layers will bend about their own individual neutral axis, and the structural contribution from the facesheets will be minimal.

The MES Composites use through-thickness polymer reinforcements, which extend through the perforations in the electrode stack and mechanically link the two structural CFRP facesheets on either side together. The through-thickness reinforcements allow load transfer between the two facesheets and inhibit the relative slipping between the adjacent electrode layers. This significantly increases the stiffness and strength of the MES Composites over regular lithium-ion batteries as the entire laminate is able to bend about a common neutral axis.

The MES Composites are capable of simultaneously providing a high mechanical load-carrying capability, as well as storing electrical energy. By permitting the two materials to be mutually beneficial and become multifunctional, weight and volume of the MES-Composites-powered devices can be minimized.

Example 1.1—Fabrication of MES Composite Li-ion Cells

An MES Composite li-ion cell comprises the following three main components: the core battery electrode stack, the CFRP facesheets, and the polymer reinforcements.

Electrode Stack.

The battery core is constructed from a stack of alternating anode and cathode layers, with each adjacent layer separated by a thin microporous polymer separator. Conventional production active materials were used for the cathode and the anode, which were Lithium Nickel-Cobalt-Manganese (NCM) and graphite respectively. All the sample types used 11 anode and 10 cathode layers—the external electrode dimensions measured 90 mm×90 mm.

Figure 13:
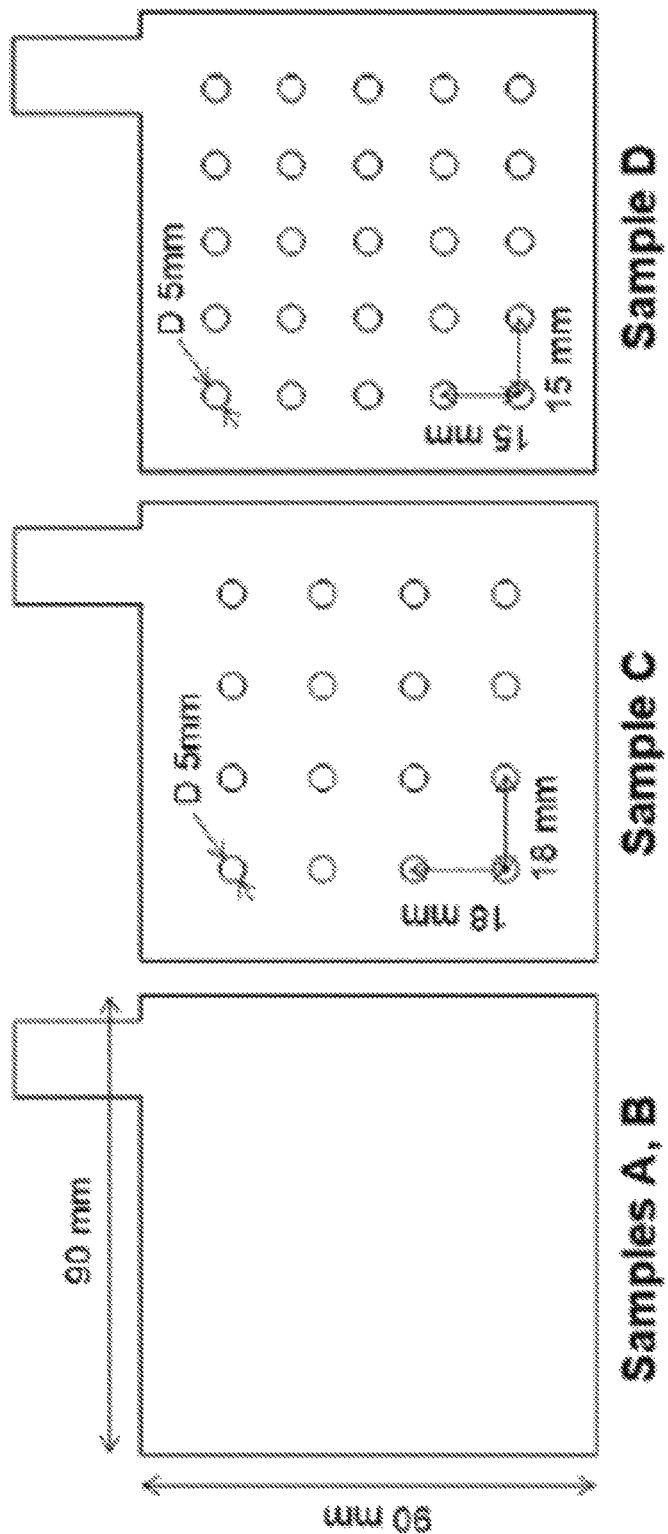
FIG. 13 shows anode dimensions and locations of perforations for Samples A and B (Left), Sample C (Middle), and Sample D (Right).

The electrodes were cut and perforated at the locations where the through-thickness reinforcements will be placed, prior to lamination. The patterns of the through-thickness reinforcement array for the different sample types are shown in FIG. 13, for anode. A separate design for the cathode was made such that the anode coverage is slightly larger than the cathode (0.5 mm in every direction) to ensure that excess anode was present and reduce the possibility of shorting. After stacking, the separators were spot-melted to bridge the through-thickness holes. The cathode's copper current collectors were ultrasonically welded together onto a nickel tab, and similarly for the anode's aluminum current collectors using an aluminum tab.

The thickness of the complete electrode stack measured approximately 3.5 mm. For Sample A, the stack was then pouched in a standard aluminum-laminate packaging. For Samples B, C, and D, the electrode was subsequently encapsulated in the CFRP facesheets, as will be described.

CFRP Facesheet.

Dry 3K 2×2-Twill T300 carbon fiber fabric was used in a vacuum-assisted resin infusion process to fabricate the CFRP facesheets. Three carbon fiber layers ([0,90] orientation) were infused with the unmodified liquid epoxy system (Bisphenol A diglycidyl ether (DGEBA)+Triethylene tetramine (TETA) (stoichiometric)). The laminate was then cured at room temperature for 24 hours, followed by a post-cure at 90° C. for 30 minutes. A thin layer (150 microns thick) of a polyolefin copolymer, which is the same type of polymer as that of the reinforcements, is coated onto one side of the facesheets. The thin polymer layer serves to contain the liquid electrolyte within the electrode stack; helps bond the facesheet to the reinforcement pillars and edge-filling frame; and provides an inert surface coating for the structural facesheets. The laminate was then cut into 110 mm×160 mm facesheet pieces.

Polymer Reinforcements and Assembly.

Figure 14:
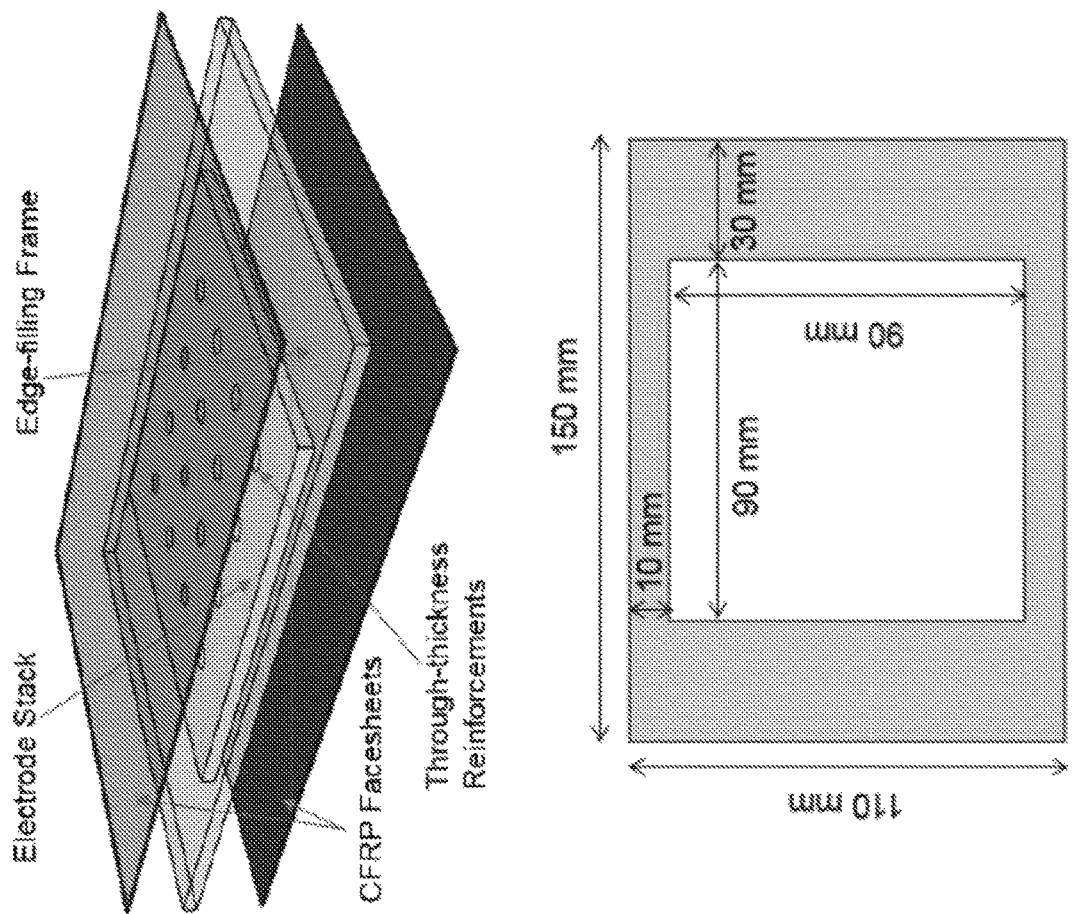
FIG. 14 shows (top) an example MES composite assembly and internal components; (bottom) dimensions of the edge-filling frame.

An edge-filling polymer frame is cut from a 3.5 mm-thick sheet of the same thermoplastic polyolefin polymer, into the dimensions as shown in FIG. 14. An opening is made in order to be able to put the electrode stack in the middle. The frame serves to contain the electrolyte within the electrode stack core, and also enhances the mechanical performance of the MES Composite li-ion cells. The frame width of 10 mm in this case is more than sufficient for electrolyte containment. The length of the frame (and CFRP facesheets) was designed to be 160 mm to allow for 30 mm overhangs in a three-point-bending test, as will be discussed further.

The perforations in the electrode stack were then filled with thermoplastic polymer cylindrical plugs, placed inside the opening of the edge-filling polymer frame, and sandwiched between two facesheets (FIG. 14). The assembly was hot-pressed to melt and fuse the polymer reinforcements to the facesheets. The cell was filled with a standard Li-salt electrolyte (LiPF6 in EC/DMC/DEC organic solvent), edge-sealed, formed, degassed, and re-sealed. It should be noted that even without the standard Li-ion battery pouch, the cell could subsequently undergo a standard cell fabrication process, as the facesheets and the polymer frame serve as the cell enclosure.

As a separate screening experiment to test the permeability of the electrolyte through the polymers, cathode electrodes were coated with a thin layer of the polymer and flooded beaker cells with lithium metal counters electrodes were assembled. In all cases the flooded beaker cell showed an open circuit even after leaving the coated cathodes soaking for one week, suggesting that the coating polymer layers would serve as good barriers against electrolyte diffusion, thereby protecting the encapsulating epoxy.

Another separate experiment evaluates the compatibility between the polymer used for the reinforcements and the epoxy in the structural facesheets in the presence of the LiPF6 electrolyte. The compatibility study consisted of storing the polymer in the presence of the battery electrolyte at room temperature and at 45° C. in a glove box while monitoring for any polymer dissolution, swelling, and reactivity. The polymer showed no significant change in the presence of the electrolyte making them compatible materials for integration into the new polymer rivet cell designs.

Example 1.2—Experimental Characterization

Four types of samples were fabricated and tested electrochemically and mechanically in this example, as summarized in Table 1.

TABLE 1

Sample Types and Description

| Sample Type | Sample Description | Electrochemical Characterization | Mechanical Testing | Dimensions & Weight |
|---|---|---|---|---|
| A | Al-laminate packaging No perforations | ✓ | | 90 × 90 × 3.5 mm 81 ± 1 g |
| B | MES Composite No perforations | | ✓ | 160 × 110 × 5 mm (110 × 110 × 5 mm - functional) 120 ± 5 g |
| C | MES Composite 4 × 4 perforation array | ✓ | ✓ | 160 × 110 × 5 mm (110 × 110 × 5 mm - functional) 120 ± 5 g |

TABLE 1-continued

Sample Types and Description

| Sample Type | Sample Description | Electrochemical Characterization | Mechanical Testing | Dimensions & Weight |
|---|---|---|---|---|
| D | MES Composite 5 × 5 perforation array | ✓ | ✓ | 160 × 110 × 5 mm (110 × 110 × 5 mm - functional) 120 ± 5 g |

Figure 12:
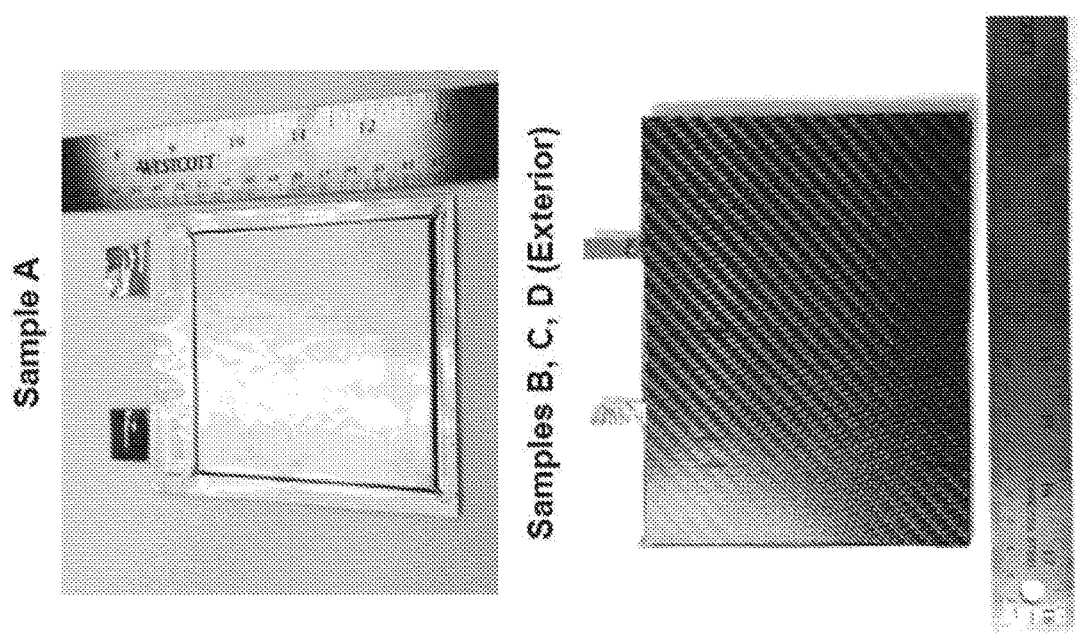
FIG. 12 shows manufactured samples (Top) Sample A—Non-perforated electrode stack packaged in aluminum-laminate pouch; (Bottom) MES composite Samples B, C, D with the same external dimensions.

The Sample A (FIG. 12 (Top)) was essentially a standard 4.6Ah Li-ion pouch cell, encapsulated in a conventional aluminum-laminate packaging. Its purpose was to serve as a baseline for electrochemical characterization. Mechanical testing was not performed on this sample type, as discussed in the subsequent section.

Samples B, C, and D (FIG. 12 (Bottom)) were MES Composites, with Li-ion battery active materials encapsulated in CFRP facesheets. All of them except Sample B underwent both electrochemical characterization and mechanical testing. The difference between Samples B, C and D was the density of the through-thickness reinforcement array. Sample B did not have any through-thickness reinforcements, while Samples C and D contained 4×4 and 5×5 arrays of equally-spaced cylindrical reinforcements respectively (FIG. 13). The active electrode stack for all sample types includes 11 and 10 90×90 mm double-sided anode and cathode layers respectively.

Electrochemical Characterization.

The MES Composites had a thorough electrochemical feasibility characterization, namely cell capacity, cell impedance, and cycle life performance, as its construction significantly differs from that of a conventional Li-ion cell.

After a solid electrolyte interphase (SEI) formation step, the Samples A, C and D were first subject to an initial slow-rate charge-discharge cycle between 3.0V and 4.2V, where the testing protocol was calibrated to obtain the C-rate (1C-rate is the rate at which the battery will be fully charged or discharged in 1 hour).

The samples then underwent the initial electrochemical Reference Performance Test (RPT). The cells were cycled at a C/3 (3 hours to fully charge or discharge the cell) rate, or approximately at 1300 mA. At the beginning of life (BOL) of each sample, the cell DC impedance was also measured. The test was performed using a Hybrid Pulse Power Characterization (HPPC) test profile during the first C/3 discharge. The technique evaluates the cell DC impedance at every 10% of Depth of Discharge (DoD) by measuring the voltage difference during the current interruption.

The C/3 charge-discharge cycle was repeated to compare the retention of discharge capacity with increasing number of cycles between the different samples types.

Mechanical Testing.

A flexural (three-point bending) test was performed on Samples B, C, and D after the initial electrochemical RPT, to evaluate the mechanical feasibility of the MES Composites. The interlayer-shear inhibition capability of the through-thickness reinforcements could be validated through measuring and comparing the sample's bending rigidity.

Figure 15:
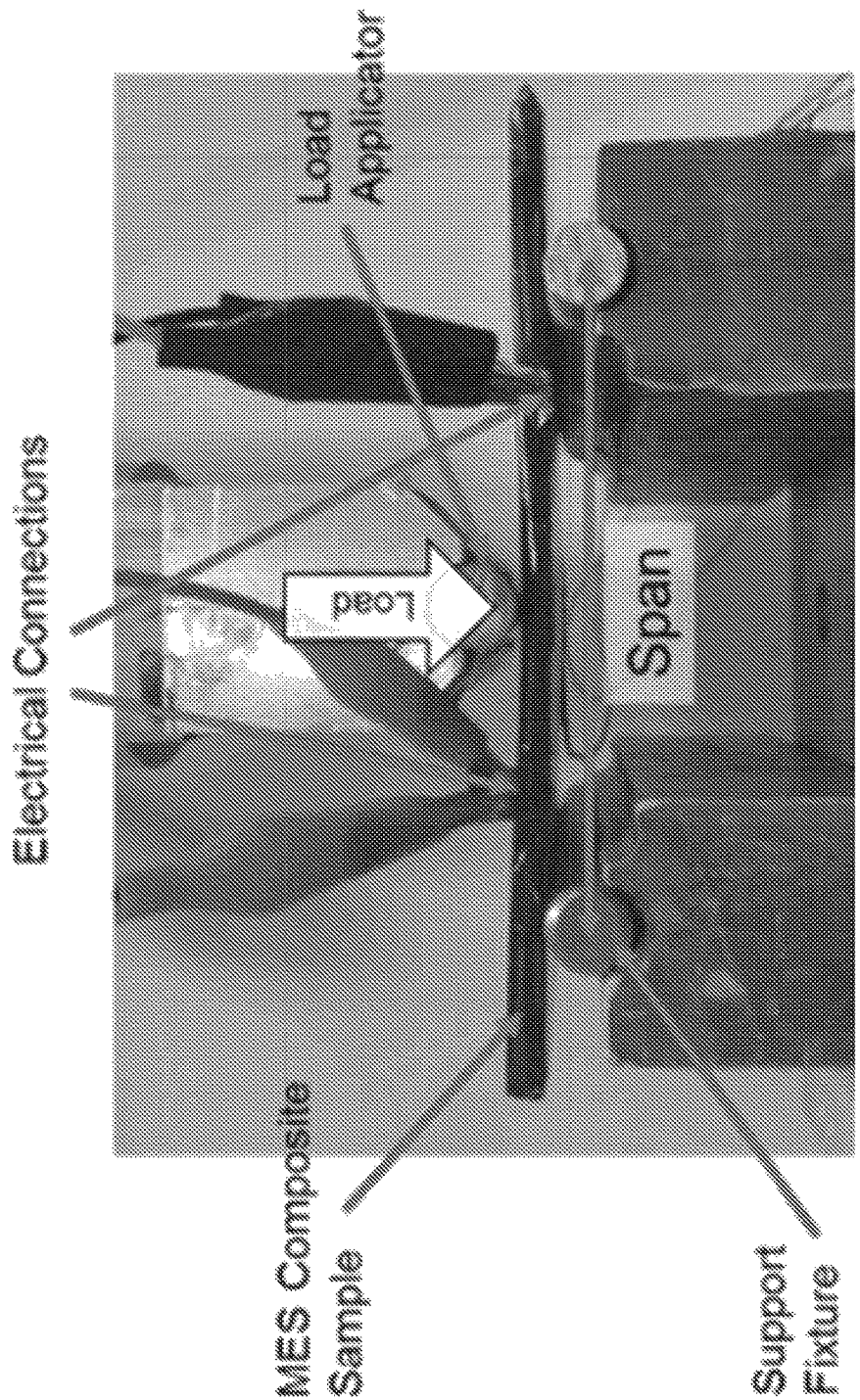
FIG. 15 shows three-point-bending test setup for Samples B, C, and D.

Testing was performed on a three-point bending fixture with cylindrical-roller load applicator and supports using a 100 mm span, on an MTS test system (FIG. 15). The span allowed for an overhang of 30 mm on either side of the samples (lengthwise direction). The support span was approximately 20 times the depth, which was sufficient to avoid significant influence from transverse shear. The displacement at the mid-span was constantly measured while the crosshead was displaced at the rate of 0.127 mm/mm/min (quasi-static). The bending rigidity can be determined from the slope of the load-displacement curve using Equation 1.

$$EI = \frac{L^3}{48} \frac{dP}{d\delta_p} \qquad (1)$$

Where EI is the effective bending rigidity, L is the support span, and $dP/d\delta P$ is the slope of the load-displacement curve, in which P is the load and $\delta P$ is the resulting mid-span displacement.

The mechanical testing was interrupted when the mid-span deflection reached 1 mm. After that, the sample was removed from the mechanical test machine, and a sequential electrochemical RPT was performed. The test was then repeated for a mid-span deflection of 2 mm.

The discharge curves, discharge capacity, and DC impedance before loading (pristine sample condition) could be compared with the results after mechanical load has been applied. This serves to indicate any non-fatal degradation in the battery performance due to mechanical loading.

Example 1.3—Experimental Results

Electrochemical Characterization.

Figure 16:
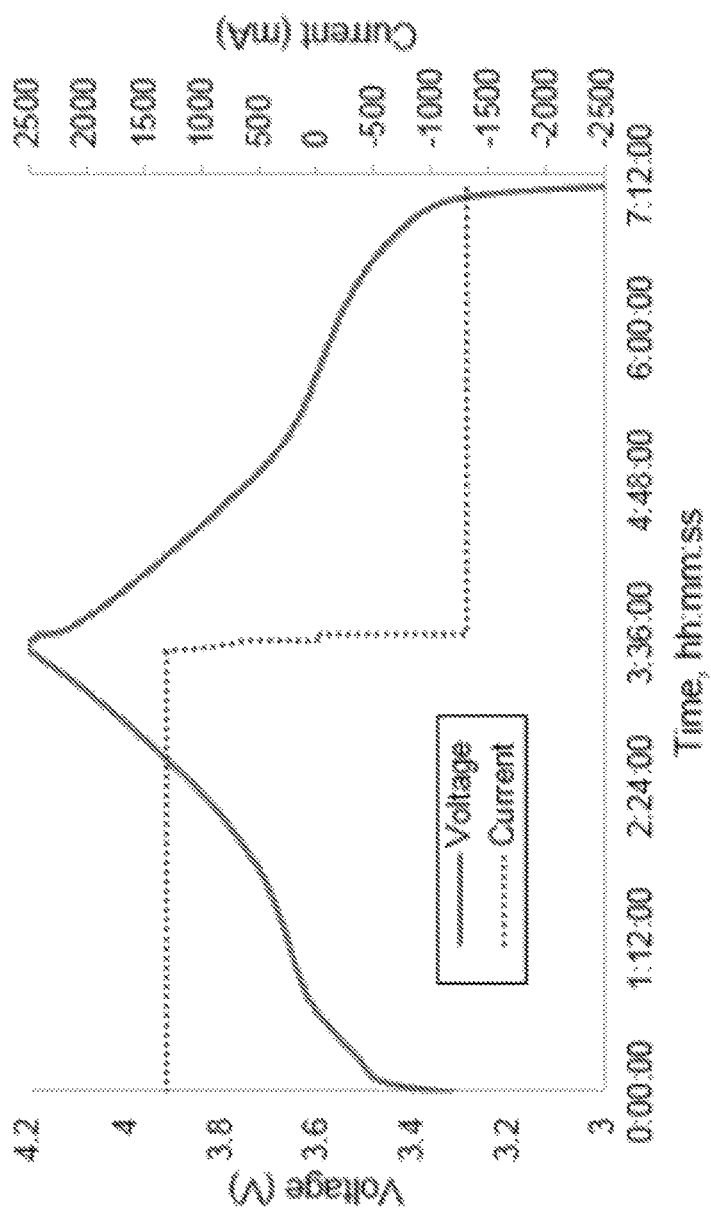
FIG. 16 shows voltage and current time-history for a nominal cycle of Sample C at C/3 rate.

FIG. 16 presents the voltage and current history with time of a nominal C/3 cycle of a typical MES Composite Sample C, showing the typical characteristics of the graphite/NMC chemistry. The charge-discharge current was 1300 mA (approximately C/3).

The first discharge capacity was summarized in Table 2, for the MES Composite cells (Samples C and D) and the control Sample A, in comparison with the theoretical values. The theoretical capacity of each cell type can be calculated from the active material loading and the remaining surface area after perforation.

TABLE 2

Summary of first discharge capacity, in comparison with the theoretical capacity calculated from the added amount of active materials

| Sample Type | Sample Description | Active Surface Area per Layer | Theoretical Capacity | Measured First Discharge Capacity |
|---|---|---|---|---|
| A | Al-laminate packaging No perforations | 7921 mm² (100%) | 4602 mAh (100%) | 4602 mAh (100%) |

TABLE 2-continued

Summary of first discharge capacity, in comparison with the theoretical capacity calculated from the added amount of active materials

| Sample Type | Sample Description | Active Surface Area per Layer | Theoretical Capacity | Measured First Discharge Capacity |
|---|---|---|---|---|
| C | MES Composite 4 × 4 perforation array | 7469 mm² (94.3%) | 4340 mAh (94.3%) | 4243 mAh (92.2%) |
| D | MES Composite 5 × 5 perforation array | 7215 mm² (91.1%) | 4192 mAh (91.1%) | 3974 mAh (86.4%) |

As expected, the first discharge capacity of the MES Composite cells decreased as the loss of area increased due to the perforations in Samples C and D respectively. The active surface area in Sample C was 94.3% of that in Sample A due to the 4-by-4 perforations, and 91.1% for the case of Sample D.

Figure 17:
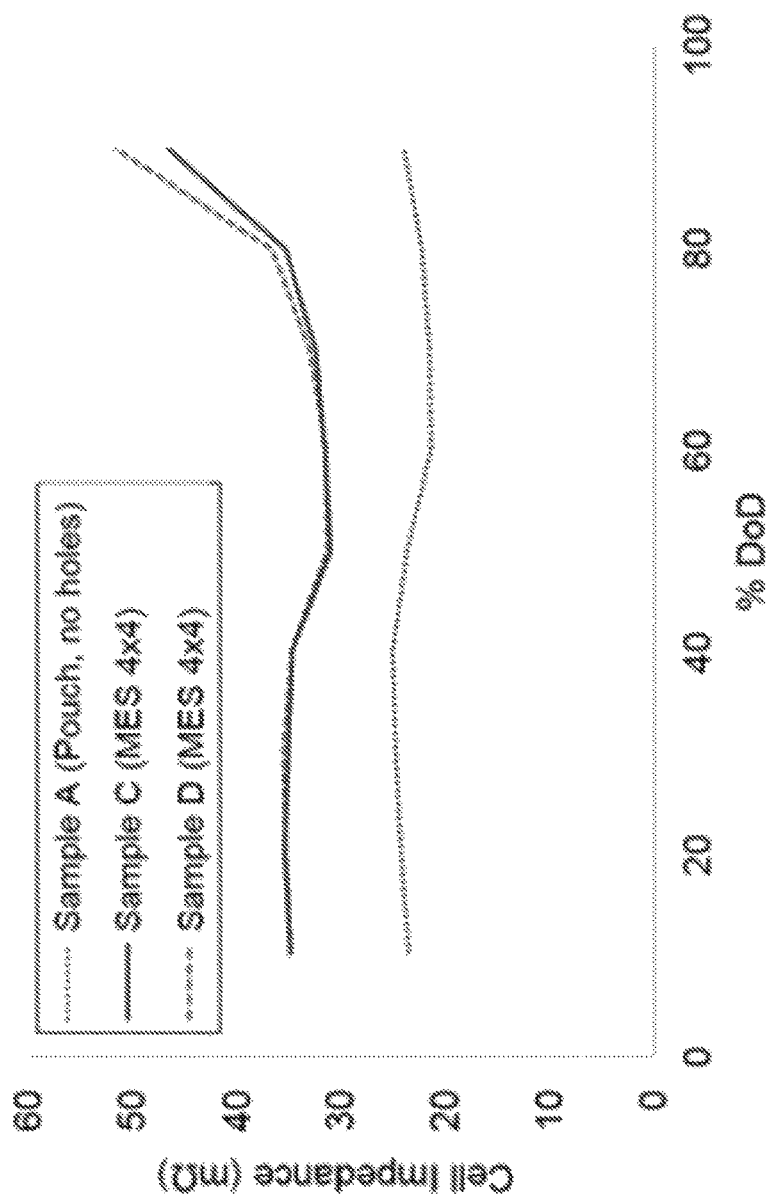
FIG. 17 shows cell DC impedance calculated from the HPPC test profile during a C/3 discharge (1 hour rest, 30 s 1C discharge pulses).

Yet, it can be observed that the measured first discharge capacity of the MES cells were marginally lower than the predicted values (2.1% for Sample C and 4.7% for Sample D), but still within an acceptable extent. The discrepancies were thought to be linked partly to the slightly higher DC impedance in the MES Composites, shown in FIG. 17. At 50% DoD, the DC impedance of Sample A (baseline) was 23 mΩ, whereas the impedance was measured to be approximately 31 mΩ for Samples C and D, approximately 35% higher.

The capacity hit and high impedance were likely due to the perforations and the non-standard cell build. The perforated electrodes in MES Composite Samples C and D have more free edges (holes edges) than the non-perforated Sample A. Imperfections from electrode cutting, such as edge burrs and active material flaking, would be more pronounced for the perforated electrodes. Also, with more free edges than a regular cell, slight misalignment between adjacent anode-cathode pairs can cause a greater loss in the actual active surface area, resulting in a reduction in cell capacity. The high-temperature, high-pressure assembly process might also cause the electrode layers and separator to deform or wrinkle, and impair the ionic pathway. Lastly, there might also be a negative impact on the electrochemistry and thus the cell capacity from the presence of the facesheet and polymer reinforcement materials.

Figure 18:
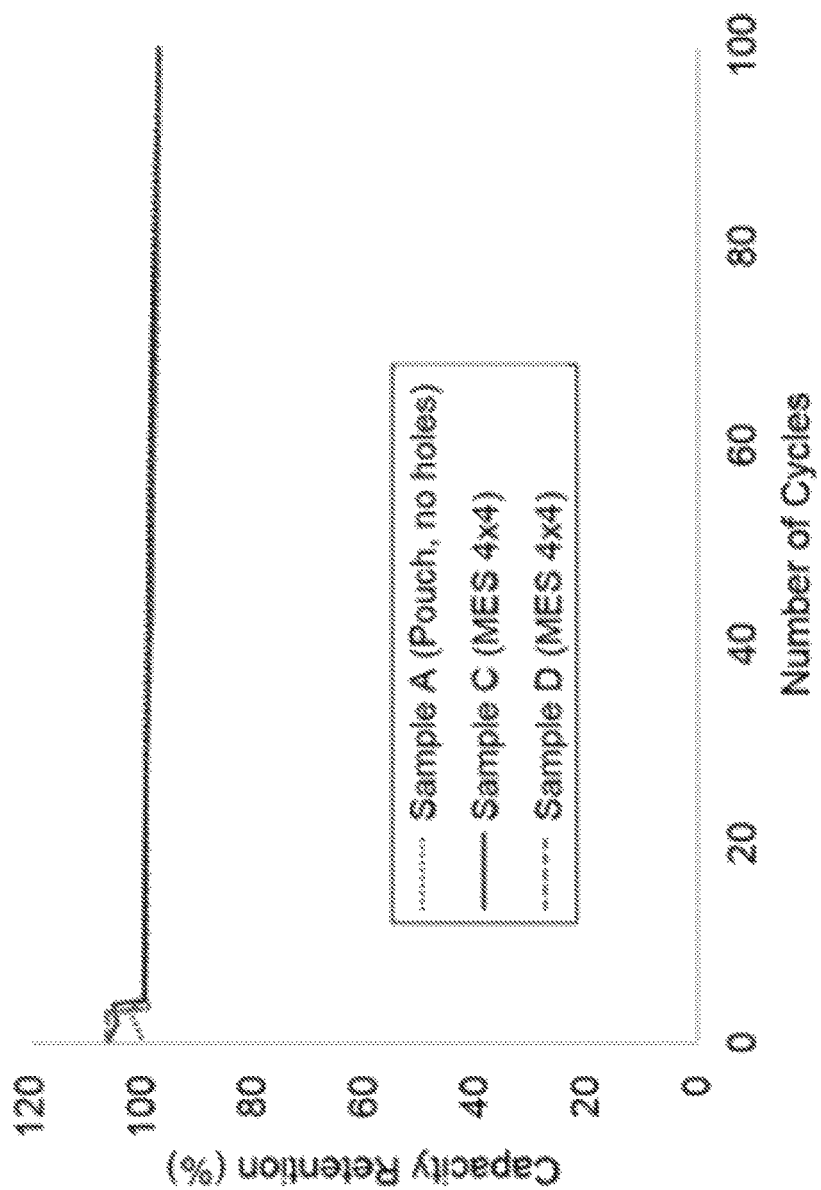
FIG. 18 shows capacity retention, as percentage of the first discharge capacity, with increasing cycle number for Samples A, C and D.

FIG. 18 shows the C/3-cycle capacity retention with increasing cycle number of the MES Composites Samples C and D, in comparison with the baseline Sample A. The capacity retention of the MES Composites, with respect to the initial discharge capacity, was found to be approximately 96% after 200 cycles, similar to the cycle-life performance of the baseline cell. The capacity fade of MES Composites is on par with commercial-grade production Li-ion batteries, despite of substantial deviation in the architecture and fabrication from conventional Li-ion pouch cells.

In summary, the electrochemical characterization has shown that a working MES Composite can be successfully fabricated and has electrochemical capability that is comparable to conventional Li-ion batteries.

Mechanical Testing.

Figure 19:
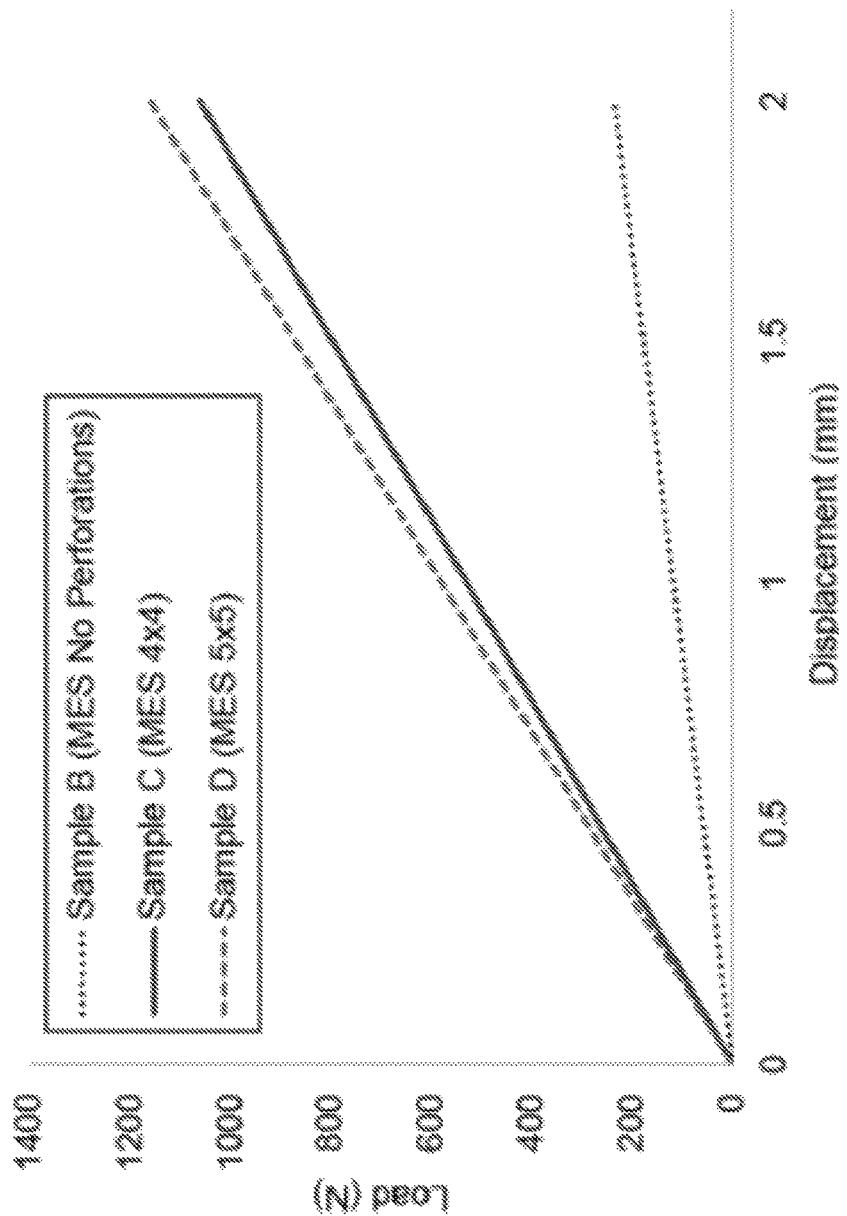
FIG. 19 shows load-displacement curves from the three-point bending test for representative Samples B, C, and D.

The typical load versus mid-span displacement curves for the three point bending of Samples B, C, and D are shown in FIG. 19. The curves were found to be linear up to the maximum deflection (2 mm) applied during this experiment, and the slope values were repeatable for the different load-unload instances. The slope values were calculated through linear regression on the load-displacement data in the 0-0.5 mm deflection region. The "effective" bending rigidity was then found using Equation 1, and summarized in Table 3.

TABLE 3

Summary of load-displacement slopes (load per unit mid-span displacement) and calculated effective bending rigidity

| Sample Type | Sample Description | Load-displacement Slope | Effective Bending Rigidity |
|---|---|---|---|
| B | MES Composites No perforations | 118 ± 10 N/mm | 2.5 ± 0.3 Nm² |
| C | MES Composite 4 × 4 perforation array | 530 ± 7 N/mm | 11.0 ± 2.0 Nm² |
| D | MES Composite 5 × 5 perforation array | 580 ± 20 N/mm | 12.1 ± 0.7 Nm² |

It can be seen that the effective stiffness of Sample C (4×4 MES cell) was 11.0 Nm², which was as high as 4.4 times that of Sample B (non-perforated MES cell) at 2.5 Nm². The significant increase in rigidity can be attributed to the presence of the through-thickness reinforcements that effectively prevent the sliding motion between the layers and allow load transfer between the two facesheets. The bending rigidity ratio increased to 4.8 for Sample D, as the reinforcement array density increased to 5-by-5. Intuitively, the denser the reinforcement array, the greater the bending rigidity becomes. However, this comes with trade-off in the reduction of active material volume, and consequently lower energy density.

Figure 20:
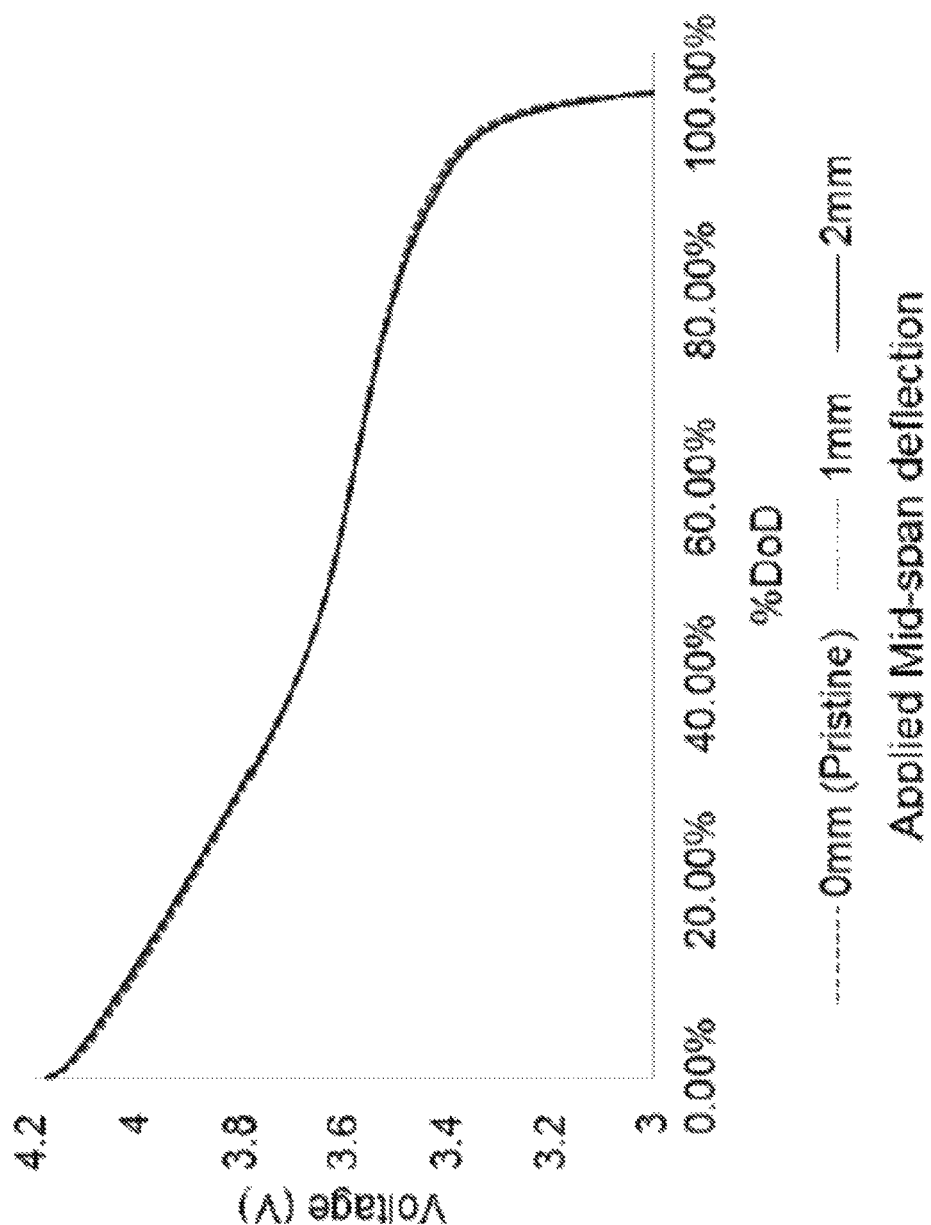
FIG. 20 shows voltage versus depth of discharge (DoD) for a C/3 discharge of a representative Sample D at the pristine condition, and after 1 mm and 2 mm mid-span mechanical bending has been applied.

FIG. 20 shows the C/3 discharge voltage time-history of Sample D before loading (pristine), and after mid-span bending deflection of 1 mm (corresponding load of 530 N), and 2 mm (1160 N) respectively. Similarly to Sample B and C, there is a slight deviation in the discharge time history with increase in mechanical load levels.

Figure 21:
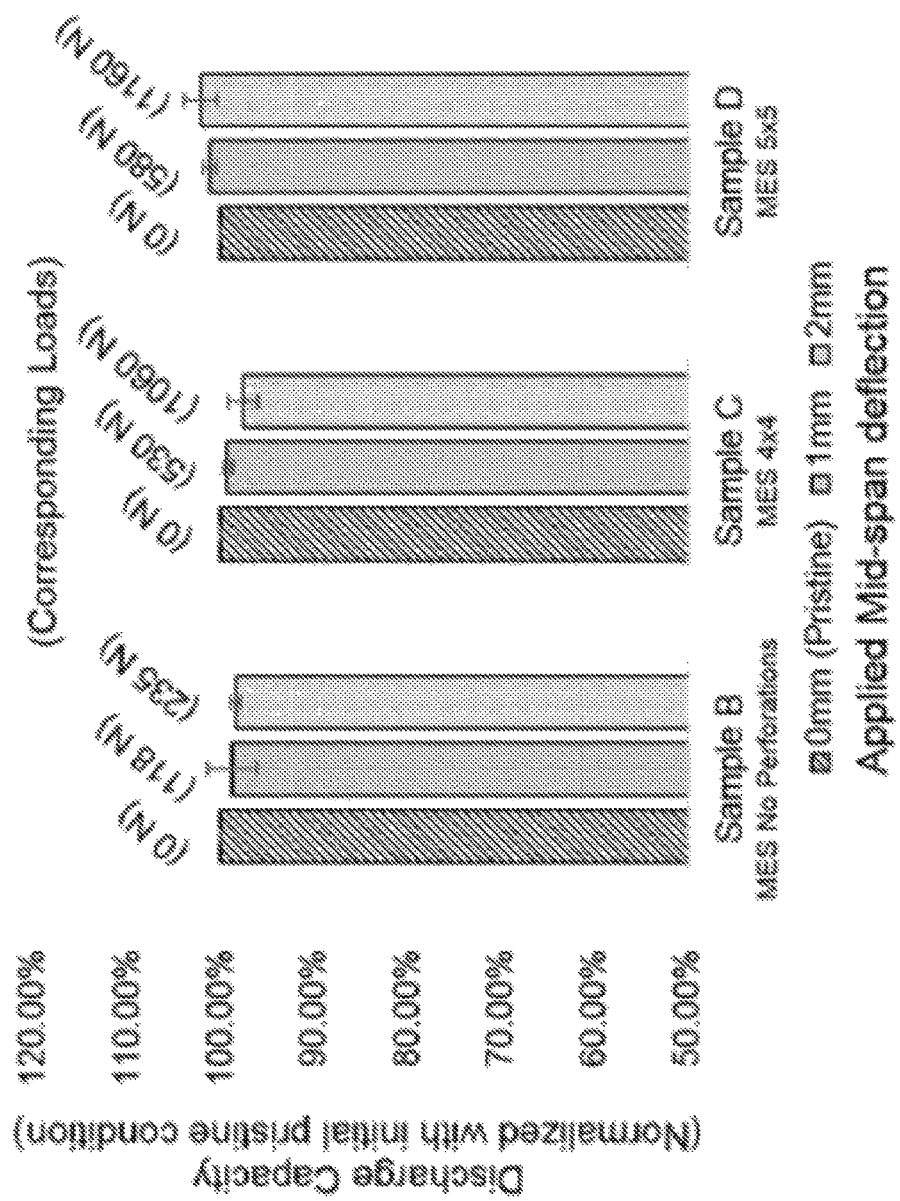
FIG. 21 shows effects on discharge capacity due to mechanical bending loads for Samples B, C, and D. Normalized discharge capacity after 1 and 2 mm deflection has been applied at mid-span, in comparison with that at pristine condition.
Figure 22:
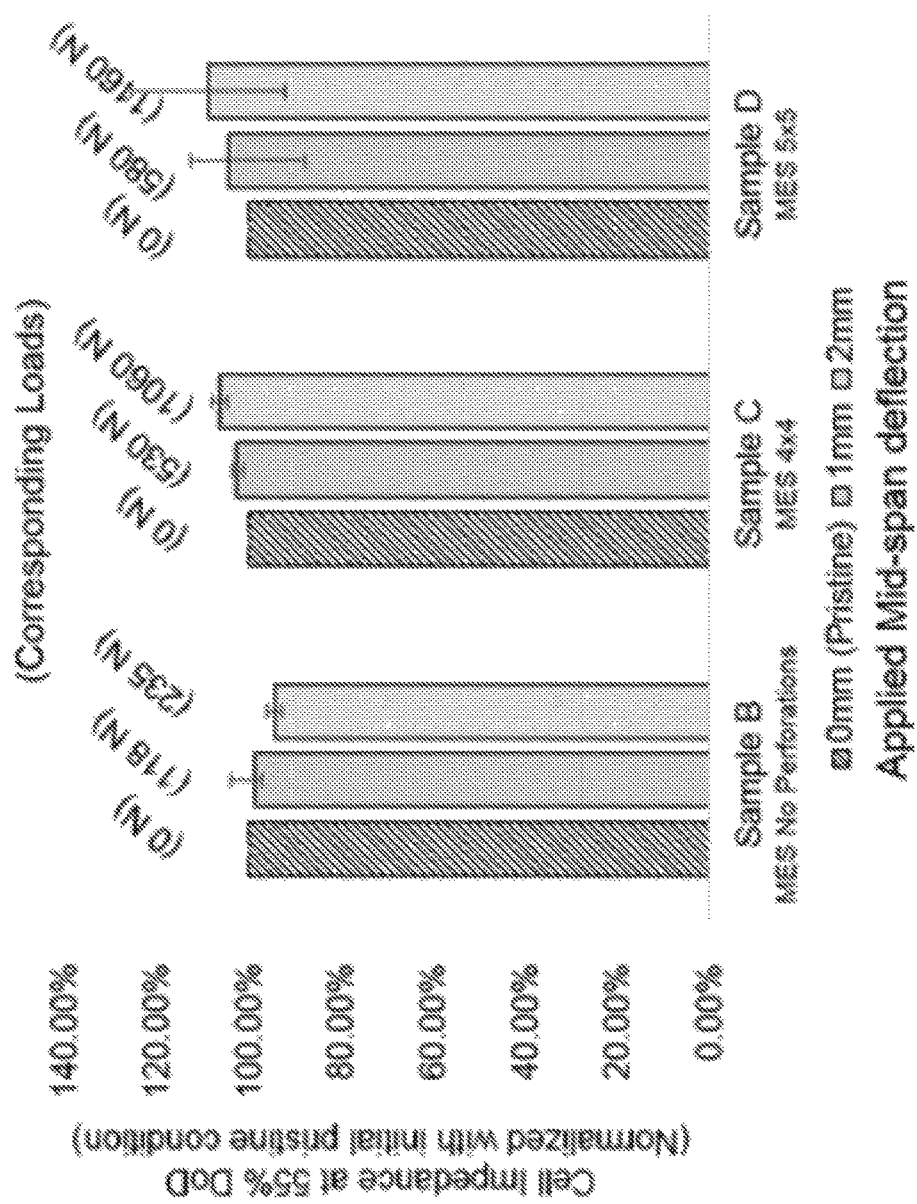
FIG. 22 shows effects on cell DC impedance due to mechanical bending loads for Samples B, C, and D. Normalized cell impedance at 50% DoD after 1 and 2 mm deflection has been applied at mid-span, in comparison with that at pristine condition.

The normalized C/3 discharge capacity and cell impedance (at 50% DoD) after exposure to the incremental quasi-static loads are shown in FIG. 21 and FIG. 22 respectively. The results after load application were normalized, in terms of percentage, with the values at pristine condition (100%—leftmost column of each cluster). This concurs with the results in the discharge curves—that is, no clear trend could be seen in the capacity and cell impedance results with increasing loading.

Up to the maximum mid-span deflection (2 mm over 100 mm span) in this test, no observable degradation due to the quasi-static load could be seen in the MES Composites. Moreover, it is worth noting that, at the same level of deflection (2 mm over 100 mm span), the load carrying capability has increased from 235N to 1060N, and 1160N, for the non-perforated, 4×4, and 5×5 MES cells respectively. This illustrates that the CFRP encapsulation and through-thickness reinforcement are capable of maintaining the integrity of the battery and the electrical connection and preventing non-fatal electrochemical injury that could have come from mechanical loads.

Summary of Figures of Merits.

The summary of the figures of merit of the different sample types is shown in Table 4. The C/3 discharge capacity for Sample A is 4.602 Ah. At a nominal cell voltage of 3.7 V, the cell energy thus becomes 17.0 Wh. Sample A weighs 81 g, and has the total volume of 28.4 mL, resulting in the gravimetric and volumetric energy density of 210 Wh/kg and 599 Wh/L respectively. Similar calculations can be carried out for Samples B, C, and D, and summarized in Table 4.

TABLE 4

Summary of Figures of Merits

| Sample Type | Sample Description | Bending Rigidity | Gravimetric Energy Density | Volumetric Energy Density |
|---|---|---|---|---|
| A | Al-laminate packaging No perforations | (0.6 Nm$^2$*) | 210 Wh/kg | 599 Wh/L |
| B | MES Composite No perforations | 2.5 Nm$^2$ | 142 Wh/kg | 281 Wh/L |
| C | MES Composite 4 × 4 perforation array | 11.0 Nm$^2$ | 131 Wh/kg | 259 Wh/L |
| D | MES Composite 5 × 5 perforation array | 12.1 Nm$^2$ | 123 Wh/kg | 243 Wh/L |

*Estimated from published values and adjusted for the difference in the cross-section geometry and moment of inertia.

By adopting the MES Composite concept to Li-ion battery materials, a cell with bending rigidity close to as much as 20 times higher than that of a regular pouch cell was obtained. This comes with approximately 40% and 60% sacrifice in the gravimetric and volumetric energy density. Even though, the energy storage performance might be sub-optimal if considered individually, structural components at the system level can be replaced with the multifunctional MES Composites, potentially resulting in the system-level weight and space savings.

It has been shown that the MES Composites can concurrently carry mechanical loads and store energy. The MES Composites utilizes through-thickness polymer reinforcement pillars that penetrate through perforations in the Li-ion battery electrode stack. The through-thickness reinforcements provide substantial mechanical integrity to the cell by rigidly linking the structural CFRP facesheets on either side, which also serves as a containment for the electrolyte. The results have illustrated that: (a) despite being vastly different from a standard Li-ion pouch cell, the MES Composites shows electrochemical performance, which is on par with traditional batteries; (b) the through-thickness reinforcements significantly increases the bending rigidity by effectively preventing relative shearing of the electrode layers, allowing the structural facesheets to be efficiently utilized; and (c) the architecture of the MES Composites also helps keep the active electrochemical materials inside the cell intact under mechanical loads. At the maximum bending deformation (2 mm over 10 cm span) tested, the best performing MES Composite can carry up to 1160N of bending load without observable degradation on electrochemical performance.

The MES Composites can simultaneously function as both an energy storage as well as a load-carry member. The MES Composites can serve as a building-block material that can be scaled up to build structural components, with built-in energy-storage capability, for various application, and potentially resulting in a light-weight multifunctional system.

Example 2—Use of Plurality of MES Composite Cells for Structural Components

To demonstrate the concept of integrating MES Composites into actual structural components, a 10"-long, 2"-tall multifunctional multi-cell structural I-beam was constructed. Three 0.46-Ah li-ion cells were used in this working example. The cells comprise 11 anode and 10 cathode layers were built—the electrode geometry measured 1.71"× 1.22" with four 0.4"-diameter perforations. Conventional production active materials are used for the cathode and the anode, which are lithium-NCM and graphite respectively, separated by layers of polyolefin separator. Separate designs for the cathode and anode were made with anode coverage larger than the cathode to ensure that excess anode is present and reduce the possibility of shorting. The quantity of active material included in each cell theoretically amounted to a capacity of 0.46 Ah.

Figure 29:
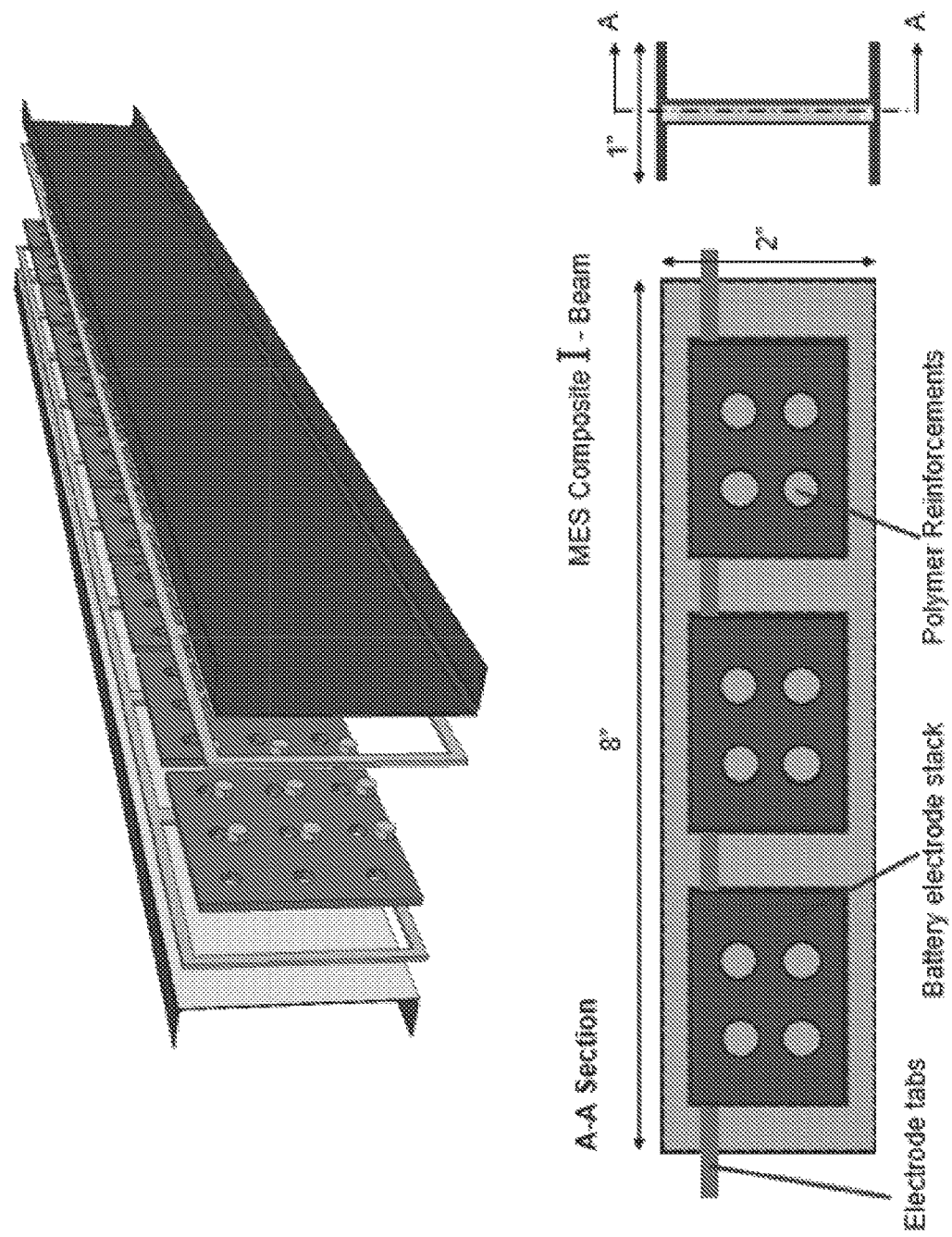
FIG. 29 shows the use of a plurality of MES composite cells as structural component.

The I-beam comprised the MES Composite with the three 0.46-Ah Li-ion cells, connected in series (3S1P configuration), in a configuration shown in FIG. 29. The complete beam had a nominal voltage of 11.1 V, and a total theoretical energy of 5.1 Wh. To connect the three separate cells in the module, the current collector foils of one cell's cathode were ultrasonically welded to the anode current collector of the adjacent cell, through a nickel tab. The positive and negative terminals extended out from either end of the I-beam. The electrical conductivity of the MES Composite module could be measured prior to addition of electrolyte (while the cell is dry) in order to ensure proper connection between the modules of the I-beam. Two CFRP C-beams (each making half of the I-beam) were made with the aforementioned wet-layup process. The three-cell string was then sandwiched between the two C-beams, with polymer plugs inserted in the perforations. The assembly was then hot-pressed to melt the thermoplastic, join the two halves of the I-beam, and encapsulate the cells. The three cells were then filled with electrolyte, went through an SEI formation process, degassed and re-sealed.

The three-cell MES Composite prototype module demonstrated a small-scale proof-of-concept. The MES Composite I-beam is charged up the specified voltage and placed on a support span of 8" separation with a 2-lb weight applied at the midpoint. The I-beam is capable of concurrently supplying electrical power to operate a 12V DC fan, drawing 150 mA constant current or 1.8 W power (~C/3). This preliminary result shows that the MES Composites could be scaled up to a multi-cell structural system and still maintain the rate capability of the baseline single cells while carrying mechanical loads. This test has proved that multi-cell MES Composite modules can safely undergo concurrent mechanical/electrochemical experiments.

As used herein, the singular terms "a," "an," and "the" include plural referents unless the context clearly dictates otherwise. Thus, for example, reference to a molecule can include multiple molecules unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in connection with a numerical value, the terms can refer to a range of variation of less than or equal to ±10% of that numerical value, such as less than or equal to ±5%, less than or equal to ±4%, less than or equal to ±3%, less than or equal to ±20%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A multifunctional energy storage (MES) composite comprising (a) a stack of energy storage materials, (b) two structural facesheets sandwiching the stack of energy storage materials, (c) one or more reinforcements perforating the stack of energy storage materials, and (d) a reinforcement frame disposed along an entire lateral perimeter of the stack of energy storage materials and between the structural facesheets, wherein the reinforcements are bonded to the structural facesheets,
    wherein one or more of the reinforcements enhance battery rigidity and further comprise a thermal device selected from the group consisting of a heat sink, a heat source, a heat pipe, and heat transfer rods arranged such that each heat transfer rod extends a length along an alignment axis passing through the perforations in the stack of energy storage materials, and wherein the heat transfer rods are positioned in thermal communication with a heat sink or a heat source.

2. The MES composite of claim 1, wherein the structural facesheets comprise at least one material selected from the group consisting of fiber-reinforced polymers, thermosets, thermoplastics, metals, metal alloys, ceramics, and polymers.

3. The MES composite of claim 1, wherein the structural facesheets comprise at least one fiber-reinforced polymer, wherein the fiber-reinforced polymer comprises fibers selected from the group consisting of carbon fibers, glass fibers, and aramid fibers, and wherein the fiber-reinforced polymer comprises a thermoset or thermoplastic.

4. The MES composite of claim 1, wherein the structural facesheets comprise at least one polymer selected from the group consisting of polyolefin, poly(ethylene-co-methacrylic acid), poly(ethylene), poly(ethylene-co-vinyl acetate), poly(ethylene-co-acrylic acid), polytetrafluoroethylene, polyoxymethylene, poly-oxydiphenylene-pyromellitimide, perfluoroalkoxy, fluorinated ethylene propylene, polypropylene, polyethylene, polyvinylidene fluoride, polyetherimide, polyether ether ketone, polyethylene terephthalate, polyester, polyamide, silicone, and combinations thereof.

5. The MES composite of claim 1, wherein at least one of the structural facesheets is coated with a coating layer of at least one polymer selected from the group consisting of polyolefin, poly(ethylene-co-methacrylic acid), poly(ethylene), poly(ethylene-co-vinyl acetate), poly(ethylene-co-acrylic acid), polytetrafluoroethylene, polyoxymethylene, poly-oxydiphenylene-pyromellitimide, perfluoroalkoxy, fluorinated ethylene propylene, polypropylene, polyethylene, polyvinylidene fluoride, polyetherimide, polyether ether ketone, polyethylene terephthalate, polyester, polyamide, silicone, and combinations thereof.

6. The MES composite of claim 5, wherein the coating layer comprises a composite of the polymer and at least one additive, wherein the additive is selected from the group consisting of plastics, ceramics, firebrick, refractory material, carbon, silicon, silica, silicon carbide, metals, metal oxides, and metal alloys.

7. The MES composite of claim 1, wherein the reinforcements comprise at least one polymer selected from the group consisting of polyolefin, poly(ethylene-co-methacrylic acid), poly(ethylene), poly(ethylene-co-vinyl acetate), poly(ethylene-co-acrylic acid), polytetrafluoroethylene, polyoxymethylene, poly-oxydiphenylene-pyromellitimide, perfluoroalkoxy, fluorinated ethylene propylene, polypropylene, polyethylene, polyvinylidene fluoride, polyetherimide, polyether ether ketone, polyethylene terephthalate, polyester, polyamide, silicone, and combinations thereof.

8. The MES composite of claim 7, wherein the reinforcements comprise a composite of the polymer and at least one additive, wherein the additive is selected from the group consisting of plastics, ceramics, firebrick, refractory material, carbon, silicon, silica, silicon carbide, metals, metal oxides, and metal alloys.

9. The MES composite of claim 1, wherein the reinforcements comprise at least one material selected from the group consisting of fiber-reinforced polymers, thermosets, thermoplastics, metals, metal alloys, ceramics, and polymers.

10. The MES composite of claim 1, wherein the reinforcements comprise at least one fiber-reinforced polymer, wherein the fiber-reinforced polymer comprises fibers selected from the group consisting of carbon fibers, glass fibers, and aramid fibers, and wherein the fiber-reinforced polymer comprises a thermoset or thermoplastic.

11. The MES composite of claim 1, wherein one or more of the reinforcements further comprise a dielectric or an inert coating on a surface.

12. The MES composite of claim 1, wherein one or more of the reinforcements further comprise a group of internal reinforcement rivets, wherein the group of reinforcement rivets are arranged such that they extend a length along an alignment axis passing through the perforations in the stack of energy storage materials.

13. The MES composite of claim 1, wherein one or more of the reinforcements further comprise of a porous rod, or wherein one or more of the reinforcements comprise a hollow rod with porous walls, or wherein the reinforcements are a plurality of tubes arranged along an alignment axis passing through perforations in the stack of energy storage materials.

14. The MES composite of claim 13, wherein pores of one or more porous reinforcements or interior of one or more hollow reinforcements or one or more tubes are filled with a fluid, a liquid electrolyte, a fuel fluid, an aqueous solution, a gas, or a thermal-management substance.

15. The MES composite of claim 14, wherein the fluid, liquid electrolyte, aqueous solution, or gas flows through the pores of one or more porous reinforcements or the interior of one or more hollow reinforcements or through the tubes along an alignment axis passing through the perforations in the stack of energy storage materials.

16. The MES composite of claim 1, wherein one or more of the reinforcements further comprise an actuator, a transducer materials, or a device selected from the group consisting of electromagnetic devices, electrochemical devices, electromechanical devices, electroacoustic devices, electrostatic devices, thermoelectric devices, and radio acoustic devices.

17. The MES composite of claim 1, where the stack of energy storage materials forms part of a device selected from the group consisting of a primary electrochemical cell, a secondary electrochemical cell, a lead-acid cell, a lithium cell, a lithium-ion cell, a zinc-carbon cell, an alkaline cell, a nickel cadmium cell, a nickel metal hydride cell, a silver oxide cell, a sodium sulfur cell, a solid electrochemical cell, a fluid electrochemical cell, a capacitor, a supercapacitor, a flow battery, a metal-air battery, and a semi-solid battery.

18. The MES composite of claim 1, wherein the structural facesheets comprise a polymer coating, and the reinforcement frame and the polymer coating comprise at least one common polymer, and wherein the reinforcement frame is fused to the polymer coating.

19. The MES composite of claim 1, wherein the structural facesheets comprise a polymer coating, and the reinforcement frame and the polymer coating are bonded by an adhesive layer or by direct chemical bonding.

20. An energy storage device comprising the MES composite of claim 1.

21. A multifunctional energy storage (MES) composite comprising (a) a stack of energy storage materials, (b) two structural facesheets sandwiching the stack of energy storage materials, (c) one or more reinforcements perforating the stack of energy storage materials, and (d) a reinforcement frame disposed along an entire lateral perimeter of the stack of energy storage materials and between the structural facesheets, wherein the reinforcements are bonded to the structural facesheets, wherein one or more of the reinforcements enhance battery rigidity and further comprise cables of conduits for electrical signal transmission and electrical conduction.

22. A multifunctional energy storage (MES) composite comprising (a) a stack of energy storage materials, (b) two structural facesheets sandwiching the stack of energy storage materials, (c) one or more reinforcements perforating the stack of energy storage materials, and (d) a reinforcement frame disposed along an entire lateral perimeter of the stack of energy storage materials and between the structural facesheets, wherein the reinforcements are bonded to the structural facesheets, wherein one or more of the reinforcements enhance battery rigidity and further comprise at least one sensor selected from the group consisting of: strain gauges, thermocouples, thermistors, pressure sensors, tactile sensors, piezoelectric sensors, voltage sensors, current sensors, and humidity sensors.

* * * * *